(12) United States Patent
Luo

(10) Patent No.: US 12,267,612 B2
(45) Date of Patent: Apr. 1, 2025

(54) METHODS AND APPARATUS FOR INTEGRATED IMAGE SIGNAL PROCESSING

(71) Applicant: Micron Technology, Inc., Boise, ID (US)

(72) Inventor: Fa-Long Luo, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 778 days.

(21) Appl. No.: 16/989,724

(22) Filed: Aug. 10, 2020

(65) Prior Publication Data
US 2022/0046200 A1  Feb. 10, 2022

(51) Int. Cl.
| | |
|---|---|
| *G06K 9/00* | (2022.01) |
| *G06T 1/20* | (2006.01) |
| *H04N 23/617* | (2023.01) |
| *H04N 25/75* | (2023.01) |
| *H04N 25/772* | (2023.01) |
| *H04N 25/79* | (2023.01) |

(52) U.S. Cl.
CPC ............. *H04N 25/79* (2023.01); *G06T 1/20* (2013.01); *H04N 23/617* (2023.01); *H04N 25/75* (2023.01); *H04N 25/772* (2023.01)

(58) Field of Classification Search
CPC .... H04N 25/79; H04N 23/617; H04N 25/772; H04N 25/75; G06T 1/20
See application file for complete search history.

(56) References Cited

U.S. PATENT DOCUMENTS 8,027,551 B2 *  9/2011  Chien ................... G06F 9/3897
                                                                 712/228
8,824,804 B2 *  9/2014  Tamatani ................. G06T 1/20
                                                                 382/245

(Continued)

OTHER PUBLICATIONS

Kessal, Lounis, Nicolas Abel, and Didier Demigny. "Real-time image processing with dynamically reconfigurable architecture." Real-Time Imaging 9.5 (2003): 297-313. (Year: 2003).*

(Continued)

*Primary Examiner* — Avinash Yentrapati
(74) *Attorney, Agent, or Firm* — Greenberg Traurig

(57) ABSTRACT

Methods and apparatus for performing multi-step image processing using a reconfigurable fabric device (RFD) in place of multiple discrete ICs. In one embodiment, the methods and apparatus operate according to a flexible time-divided schedule, and the processing is configured to process image sensor data by at least: (i) receiving RAW image data, programming an RFD to operate as a first functional unit such as an image signal processor (ISP), using the programmed RFD to perform image signal processing on the RAW image data, storing the ISP-result in temporary memory; and (ii) programming the RFD to operate as a second functional unit (e.g., deep learning accelerator (DLA)), using the programmed RFD to read out ISP-result from the temporary memory, perform deep learning processing on the ISP-result, and storing the DLA-result back into the temporary memory. In one variant, an on-die controller and memory are used in support of the RFD operations, thereby enabling a single-die processing solution.

18 Claims, 13 Drawing Sheets

(56) References Cited

U.S. PATENT DOCUMENTS

| | | | | |
|---|---|---|---|---|
| 2008/0114974 A1* | 5/2008 | Chien | G06F 9/3897 | 712/228 |
| 2010/0111489 A1* | 5/2010 | Presler | H04N 23/00 | 348/222.1 |
| 2010/0142855 A1* | 6/2010 | Dokladalova | G06T 7/11 | 382/308 |
| 2011/0311151 A1* | 12/2011 | Tamatani | H04N 19/12 | 382/233 |
| 2012/0242800 A1* | 9/2012 | Ionescu | G06V 40/107 | 348/46 |
| 2012/0269452 A1* | 10/2012 | Naito | G06T 1/20 | 382/244 |
| 2012/0275715 A1* | 11/2012 | Okuyama | G06T 1/20 | 382/232 |
| 2015/0016734 A1* | 1/2015 | Igarashi | G06T 9/00 | 382/232 |
| 2016/0048971 A1* | 2/2016 | Matsumoto | G06T 9/004 | 382/173 |
| 2018/0255244 A1* | 9/2018 | Petty | G06T 1/0007 | |

OTHER PUBLICATIONS https://ece-research.unm.edu/jimp/611/slides/chap3_1.html (Year: 1999).*

* cited by examiner

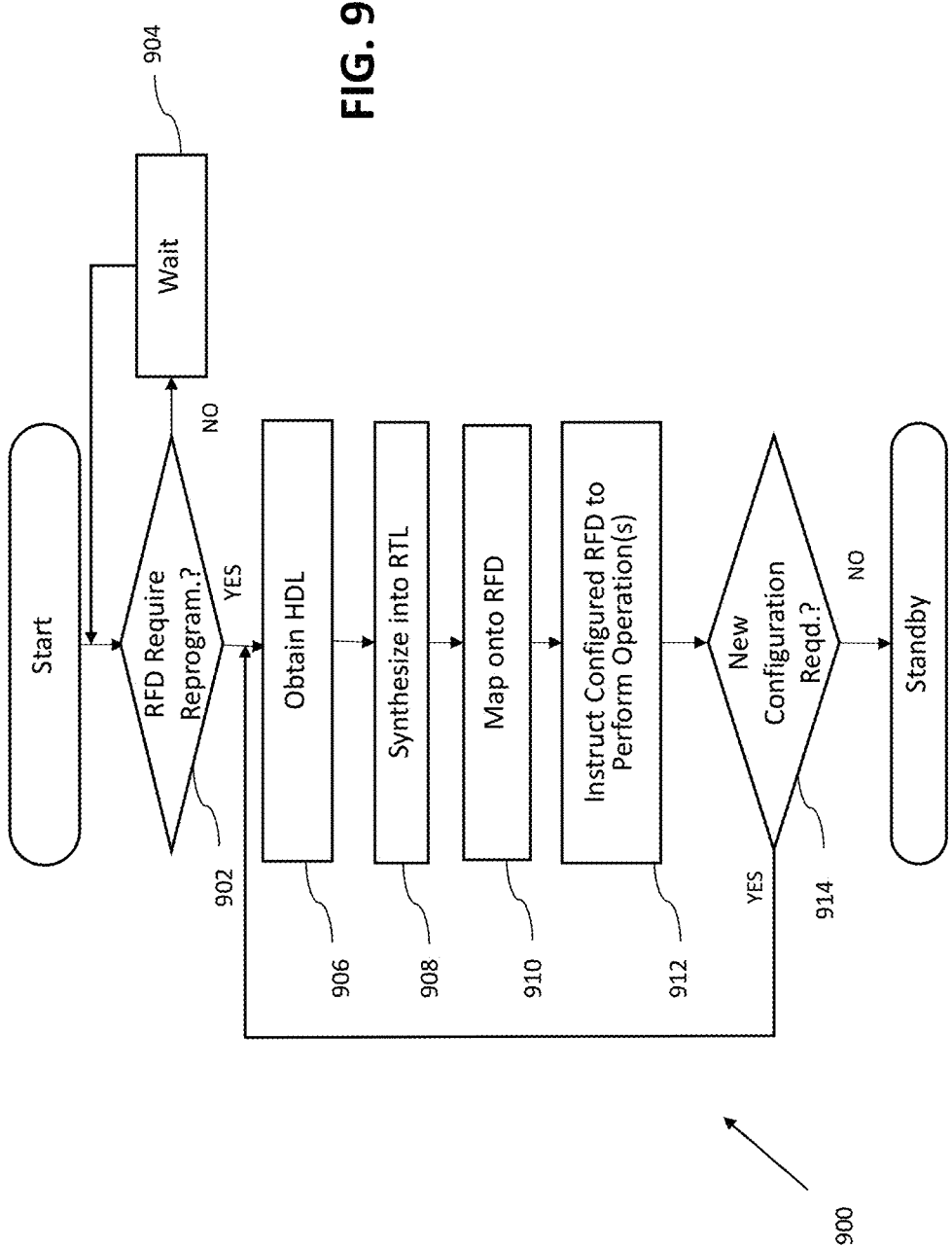

METHODS AND APPARATUS FOR INTEGRATED IMAGE SIGNAL PROCESSING

RELATED APPLICATIONS

The subject matter of this application is generally related to portions of the subject matter of co-owned and co-pending U.S. patent application Ser. No. 16/002,644 filed Jun. 7, 2018 and entitled "AN IMAGE PROCESSOR FORMED IN AN ARRAY OF MEMORY CELLS", and U.S. Ser. No. 16/874,504 filed May 14, 2020 and entitled "METHODS AND APPARATUS FOR PERFORMING ANALYTICS ON IMAGE DATA," each of which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

This disclosure relates to processing of image content, and more specifically in one exemplary aspect to performing multiple stages of signal processing using a single reconfigurable fabric.

2. Description of Related Art

Existing image capture devices (e.g., digital cameras) capture image data, such as in RAW format (which has minimal processing applied), and perform multiple software-based steps of processing in order to transform the e.g., RAW image data into an encoded image file ready for utilization, such as transmission over a wireless or wireline interface. RAW data is generally not useful for purposes of consumer utilization or consumption due to its minimal state of processing after capture by sensors such as CMOS or CCD imaging integrated circuits (ICs).

While such software-based processing has advantages in certain circumstances, it is typically far slower than hardware-based data processing, and may be unsuitable from a "user experience" perspective for more intensive applications; i.e., it may result in lengthy processing times. As such, image capture devices typically use application specific integrated circuits (ASICs) to perform various processes. What ASICs tend to lack in terms of flexibility (e.g., there is little if any "re-programmability" associated with a typical ASIC due to it being a fabricated circuit), it makes up for in terms of speed.

An image capture device may capture the aforementioned RAW data, and transform it into a processed and encoded image ready for transfer to another device via a series of generally sequential steps. The entire process may include for example: (i) transforming the RAW data into an image via an image signal processor (ISP) or sensor data processor (SDP) chip, (ii) encoding of the image data into a prescribed encoding format; (iii) processing of the encoded image data via a baseband processor (BBP) chip, such as for transmission over e.g., a wireless interface, (iv) modulating into a digital waveform via a digital frequency processor (DFP) chip (such as utilization of an OFDM transmitter), and (iv) transmitting the waveforms via a radio frequency (RF) chip.

In some cases, while some processes may be aggregated (such as via inclusion of an encoder within the ISP, or combination of the baseband processing functions with the OFDM processor), multiple discrete ICs—e.g., as many as six—may be utilized to properly process a captured image for transmission.

FIG. 1A illustrates one such multi-chip prior art approach (with various other supporting components eliminated from view for clarity). FIG. 1B illustrates one logical flow 150 of processing image data using the device of FIG. 1A. In this example, RAW image data 152 from a sensor 112 is fed to the ISP chip 114 which performs image signal processing 154 on the image data and feeds ISP-processed image data to the encoder chip 118. The encoder chip 118 reads the deep learning accelerator (DLA) processed image data, compresses/quantizes/encodes 158 the image data, and feeds the encoded image to BBP chip 120. The BBP chip 120 reads the encoded image data, further processes 160 for transfer, and transmits the result to the DFP chip 122. The DFP chip 122 reads the BBP-processed data, modulates 162 the image data into a digital waveform, such as for distribution across time-frequency resources of the aforementioned OFDM-based interface. The RF chip 124 takes the modulated digital waveform, transforms 164 to the analog domain (and may include up-conversion in frequency) and wirelessly transmits 166 the data using one or more transmission antenna 126. Aspects of this multi-process operation may be controlled by a logic/control unit 130.

Over the years, technological improvements have allowed individual processing chips shown in FIG. 1A to be significantly reduced in size. Nevertheless, multiple processing chips (each contained within individual packaging) and their interconnects have considerably higher board space requirements, and generally will consume significant electrical power in the aggregate.

In addition, the multiple physical and electrical interfaces between the various processor chips can sometimes impose limits on the rate of transfer of information through the entire system. This is especially true when processing occurs in such a serialized fashion; the processing in the aggregate is only as fast as its slowest "link." Generally speaking, more "length" of electrical conductors (such as package terminals/pinouts and PCB traces needed to support the packages) also may present electromagnetic noise issues at very high data rates.

Individual packages may also in some cases consume more electrical power than a hypothetical single-chip solution.

Furthermore, application-specific circuits such as ASICs generally do not allow for any flexibility or modifications to be implemented after the manufacturing process.

Hence, based on the foregoing, improved methodologies and apparatus are needed that enable the processing of imaging content using integrated circuit systems having fewer components (and using less board space and/or interconnects) than conventional imaging capture devices. Moreover, these methods and apparatus should enable increased flexibility of image processing within the device systems.

SUMMARY

The present disclosure satisfies the foregoing needs by providing, inter alia, methods and apparatus for enabling the processing of image data, including high-resolution imaging content.

In one aspect of the disclosure, a method for performing image data processing within a computerized device is described. In one embodiment, the method includes: obtaining image data in a first format from at least one image sensor; programming a reprogrammable processing device (RPD) to perform a first operation on at least a portion of the obtained image data; processing the at least portion of the obtained image data using the programmed RPD to generate first output data; reprogramming the RPD to perform a second operation on at least a portion of the first output data; and processing the at least portion of the first output data using the reprogrammed RPD to generate second output data.

In one variant of the method, the programming and processing the at least portion of the obtained image data using the programmed RPD are performed during a first time slot; and the reprogramming and processing the at least portion of the first output data using the reprogrammed RPD are performed during a second time slot subsequent to the first.

In one implementation thereof, the first and second time slots have different temporal durations. The first and second time slots may be e.g., generated ad hoc, or according to a prescribed schedule.

In another implementation, the first and second time slots have a same temporal duration, and are each generated prior to the programming.

In yet another implementation, the first and second time slots have a different temporal duration, and each comprises at least one prescribed mini-slot, the at least one mini-slot referenced to a clock reference of the RPD.

In another variant of the method, the obtaining image data in a first format from at least one image sensor comprises obtaining image data in a RAW format; the programming a reprogrammable processing device (RPD) to perform a first operation on at least a portion of the obtained image data comprises programming the reprogrammable processing device (RPD) to convert the at least a portion of the obtained image from the RAW format to an image format; and the reprogramming the RPD to perform a second operation on at least a portion of the first output data comprises programming the reprogrammable processing device (RPD) to apply a Bayer filter.

In a further variant, the reprogramming the RPD to perform a third operation on at least a portion of the second output data; and processing the at least portion of the second output data using the reprogrammed RPD to generate third output data. The third output data comprises e.g., encoded image data encoded according to a lossy encoding format.

In another aspect of the disclosure, computerized image capture and processing apparatus is described. In one embodiment, the apparatus includes: at least one image sensor; at least one reprogrammable processing device (RPD) in data communication with the at least one image sensor; at least one storage device in data communication with the at least one RPD; and at least one controller in data communication with the at least one RPD. In one variant thereof, the apparatus is configured to implement computerized logic causing the at least one RPD device to at least: process first data output by the at least one image sensor using a first processing configuration to produce second data; process the second data using a second processing configuration to produce third data; and process the third data using a third processing configuration to produce fourth data.

In another variant, the at least one controller is further configured to implement computerized logic causing the at least one RPD device to at least: access at least a portion of the at least one storage device to obtain the first data; access at least a portion of the at least one storage device to obtain the second data; and access at least a portion of the at least one storage device to obtain the third data. In one implementation thereof, each of the accesses to obtain the first data, second data, and third data; and each of the processing of the first data, second data, and third data, occur according to a schedule generated at least in part by the at least one controller.

In another variant, the at least one RPD, the at least one storage device, and the at least one controller are each contained within a common integrated circuit (IC) package.

In a further variant, the at least one RPD comprises a plurality of circuit logic elements which may be logically combined in a plurality of different combinations, a first of the plurality of different combinations corresponding to the first processing configuration, a second of the plurality of different combinations corresponding to the second processing configuration, and a third of the plurality of different combinations corresponding to the third processing configuration. In one implementation thereof, the at least one RPD comprises a field programmable gate array (FPGA) apparatus comprising the plurality of circuit logic elements, at least portions of the circuit logic elements comprising logic rendered in hardware.

In another aspect of the disclosure, reprogrammable integrated circuit apparatus configured for use with e.g., an image capture and processing apparatus, is described. In one embodiment, the reprogrammable integrated circuit apparatus comprises: at least one first data interface; at least one second data interface; a controller interface; and computerized logic configured to, under control of signals received via the controller interface: receive first data via the at least one first interface; process the first data using a first processing configuration to produce second data; output the second data to a storage device via the at least one second data interface; reconfigure the computerized logic to a second processing configuration; access the second data from the storage device via the at least one second interface; process the accessed second data using the second processing configuration to produce third data; output the third data to the storage device via the at least one second data interface; reconfigure the computerized logic to a third processing configuration; access the third data from the storage device via the at least one second interface; and process the accessed third data using the third processing configuration to produce fourth data.

In one variant, the IC apparatus further comprises: the storage device in data communication with the at least one second interface; and controller logic in communication with the controller interface; and wherein the storage device, the controller logic, the at least one first data interface, the at least one second data interface, the controller interface, and the computerized logic are all part of a unitary integrated circuit package. In one implementation thereof, the storage device comprises a dynamic RAM (random access memory) device; and the computerized logic comprises a reconfigurable processing fabric having a plurality of logic cells or blocks.

In another variant of the IC apparatus, the computerized logic is configured such that: at least the processing of the first data using a first processing configuration to produce the second data, and the output of the second data to the storage device via the at least one second data interface, occurs during a first time period; at least the access of the second data from the storage device via the at least one second interface, and the processing of the accessed second data using the second processing configuration to produce the third data, and the output the third data to the storage device via the at least one second data interface, occurs during a second time period; and at least the access of the third data from the storage device via the at least one second interface, and the processing of the accessed third data using the third processing configuration to produce the fourth data, occurs during a third time period.

In one implementation thereof, the first, second, and third time periods comprise non-overlapping time periods of different duration, and the IC apparatus further includes a clock circuit; and the first, second, and third time periods each comprise an integer multiple of a clock period or other clock-related parameter generated by the clock circuit.

In another variant of the IC apparatus, the storage device comprises a plurality of independently accessible storage areas, the at least one second data interface comprising a plurality of second data interfaces corresponding to respective ones of the plurality of independently accessible storage areas.

In another aspect, a method for performing multi-step processing using a reconfigurable processing device (RPD) is disclosed. In one embodiment, the RPD comprises an RFD (reconfigurable fabric device), and separate processing steps are performed during separate time slots. In one variant, the method includes: (i) programming the RFD to have a first circuit design, instructing the RFD to process initial data according to the principles of the first circuit design to obtain first result data and to write the first result data of the process into memory; and (ii) reprogramming the RFD to have a second circuit design, instructing the RFD to read the first result data, process the first result data according to the principles of the second circuit design to obtain second result data, and write the second result data into the memory. The method may further include: (iii) reprogramming the RFD to have a third circuit design, instructing the RFD to read the second result data, process the second result data according to the principles of the third circuit design to obtain third result data, and output the third result data to an external device.

In one variant, the first circuit design comprises an image signal processing (ISP) circuit design, and the initial data comprises RAW image data obtained from one or more CMOS or CCD image sensors of a camera or other imaging device.

In one implementation, programming/reprogramming the RFD includes making changes to physical structures within the RFD using at least one of a software programmable reconfiguration (SPR) approach or a PR (Partial Reconfiguration) approach.

In one variant, the first circuit design is an image signal processor design, the second circuit design is a deep learning accelerator design, and the third circuit design is an encoder circuit design. In another variant, the first circuit design is a deep learning accelerator design, the second circuit design is image signal processing design, and the third circuit design is an encoder circuit design.

In another aspect, a method for performing multi-step image processing using a reconfigurable fabric device (RFD) is disclosed. In one embodiment, the method includes: (i) receiving RAW image data, programming an RFD to operate as an image signal processor (ISP), using the programmed RFD to perform image signal processing on the RAW image data, storing the ISP-result in temporary memory; and (ii) programming the RFD to operate as a deep learning accelerator (DLA), using the programmed RFD to read out ISP-result from the temporary memory, perform deep learning processing on the ISP-result, and storing the DLA-result back into the temporary memory.

The method may further include: (iii) programming the RFD to operate as an encoder, using the programmed RFD to read out DLA-result from the temporary memory, perform encoding, and store the encoded image data back into the memory; (iv) programming the RFD to operate as a baseband processor (BBP), using the programmed RFD to read the encoded image data from memory, perform baseband processing, and write the BBP-result to temporary memory; (v) programming the RFD to operate as a digital frequency processor (DFP), using the programmed RFD to read BBP-result from memory, perform digital frequency processing, and write the DFP-result to temporary memory; and (vi) programming the RFD to operate as a radio frequency processor (RFP), using the programmed RFD to read DFP-result from memory, perform radio frequency processing, output result to an external device. In one variant, the result is transmitted using an antenna. In one embodiment, the separate RFD-programming and RFD-operating steps are performed during separate time slots.

In one aspect of the disclosure, a method of performing a first multi-step image processing operation using reconfigurable fabric device (RFD), modifying the first multi-step image processing operation into a second multi-step image processing operation, and performing the second multi-state image processing operation using the reconfigurable fabric device. In one embodiment, the first multi-step image processing operation includes, sequentially: programming the RFD to have a first circuit design, instructing the RFD to process data according to principles of the first circuit design, and programming the RFD to have a second circuit design; and the second multi-step image processing operation includes, sequentially: programming the RFD to have the second circuit design, instructing the RFD to process to process data according to principles of the second circuit design, and programming the RFD to have the first circuit design.

In another aspect, an image capture device including at least one image sensor, a transceiver/receiver, and an integrated circuit is disclosed. In one embodiment, the integrated circuit includes one or more control unit processor, one or more memory devices, and one or more reconfigurable fabric devices (RFDs). In one embodiment, the control unit is configured to provide instructions to the RFD(s) and the memory device through electric interconnects. In one variant, the memory device is integral with the RFD. In another variant, the memory device is a separate component from the RFD.

In another embodiment, the RFD includes an internal processor, internal memory, and reconfigurable fabric. The reconfigurable fabric includes one or more arrays of configurable logic blocks (CLBs), switches, and interconnects. In one variant, the CLB arrays are stacked vertically in a three-dimensional array. In another variant, the CLB arrays are disposed adjacent one another in a two-dimensional "array of arrays."

In an additional aspect of the disclosure, computer readable apparatus is described. In one embodiment, the apparatus includes a storage medium configured to store one or more computer programs, such as a control system logic module of the above-mentioned controller. In one embodiment, the apparatus includes a program memory or HDD or SSD, and is part of an image capture and processing device.

In another aspect, an integrated circuit (IC) device implementing one or more of the foregoing aspects is disclosed and described. In one embodiment, the device includes a multi-logic block FPGA device. In another embodiment, the IC device is embodied as a SoC (system on Chip) device. In another embodiment, an ASIC (application specific IC) is used as the basis of at least a portion of the device. In yet another embodiment, a chip set (i.e., multiple ICs used in coordinated fashion) is disclosed.

Other aspects, features and advantages of the present disclosure will immediately be recognized by persons of ordinary skill in the art with reference to the attached drawings and detailed description of exemplary embodiments as given below.

BRIEF DESCRIPTION OF THE DRAWINGS

The disclosed embodiments have other advantages and features which will be more readily apparent from the following detailed description of the invention and the appended claims, when taken in conjunction with the accompanying drawings, in which:

FIG. 9 is a logical flow diagram illustrating one exemplary embodiment of a method of programming and operating an RFD according to the disclosure.

Figure 1A:
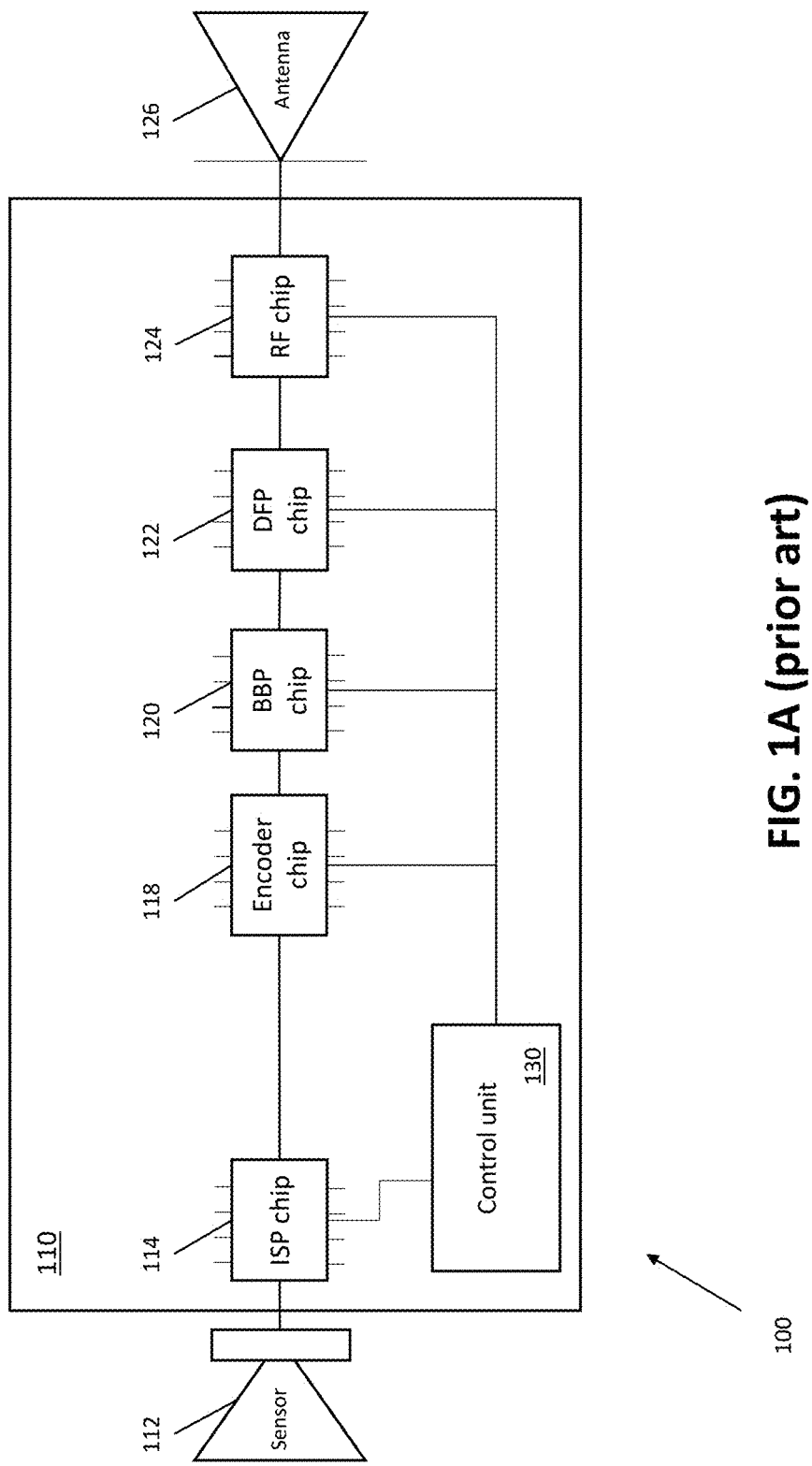
FIG. 1A is a block diagram illustrating a prior art image capture device and various ICs utilized therein.
Figure 1B:
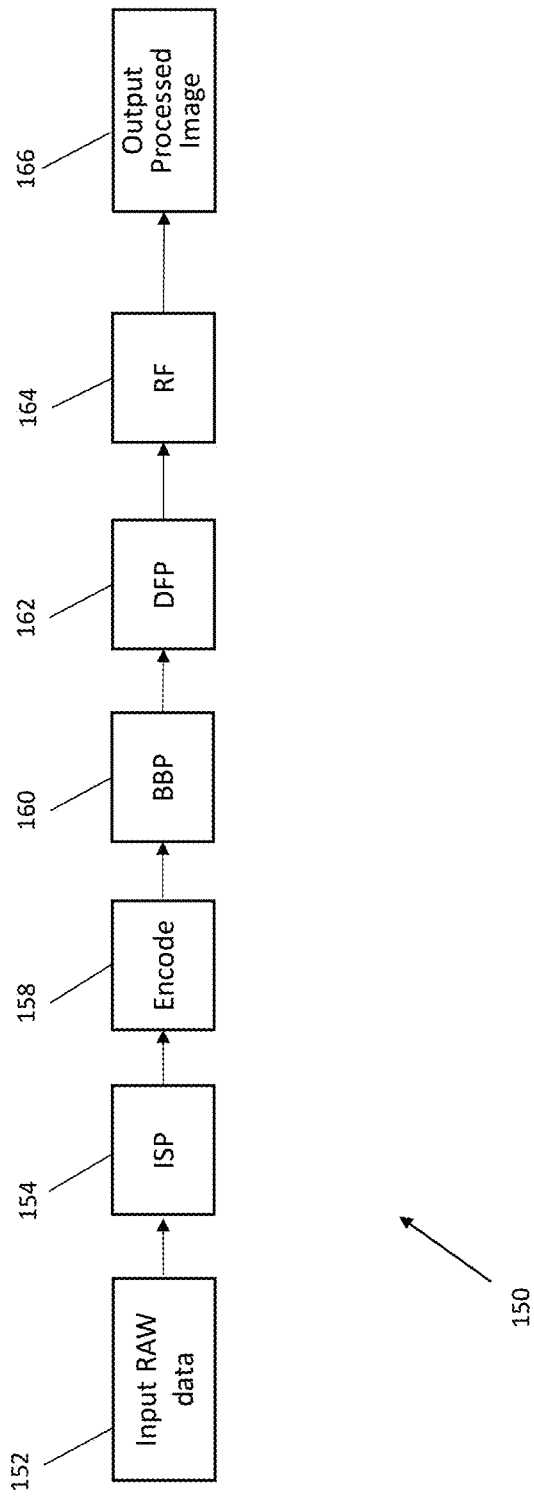
FIG. 1B is a graphical illustration of a multi-step image processing method using the device of FIG. 1A.

All Figures disclosed herein are © Copyright 2019-2020 Micron Technology, Inc. All rights reserved.

DETAILED DESCRIPTION

Reference is now made to the drawings wherein like numerals refer to like parts throughout.

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable application that runs within an operating system environment. Applications as used herein may also include so-called "containerized" applications and their execution and management environments such as VMs (virtual machines) and Docker and Kubernetes.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Register Transfer Language (RTL), VHSIC (Very High Speed Integrated Circuit) Hardware Description Language (VHDL), Verilog, and the like.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc. 5G-servicing core networks and network components (e.g., DU, CU, gNB, small cells or femto cells, 5G-capable external nodes) residing in the backhaul, fronthaul, crosshaul, or an "edge" thereof proximate to residences, businesses and other occupied areas may be included in "the Internet."

As used herein, the term "memory" includes any type of integrated circuit or other storage device adapted for storing digital data including, without limitation, random access memory (RAM), pseudostatic RAM (PSRAM), dynamic RAM (DRAM), synchronous dynamic RAM (SDRAM) including double data rate (DDR) class memory and graphics DDR (GDDR) and variants thereof, ferroelectric RANI (FeRAM), magnetic RANI (MRAM), resistive RAM (Re-RAM), read-only memory (ROM), programmable ROM (PROM), electrically erasable PROM (EEPROM or E2PROM), DDR/2 SDRAM, EDO/FPMS, reduced-latency DRAM (RLDRAM), static RAM (SRAM), "flash" memory (e.g., NAND/NOR), phase change memory (PCM), 3-dimensional cross-point memory (3D Xpoint), stacked memory such as HBM/HBM2, and magnetoresistive RANI (MRAM), such as spin torque transfer RANI (STT RAM).

As used herein, the terms "microprocessor" and "processor" or "digital processor" are meant generally to include all types of digital processing devices including, without limitation, digital signal processors (DSPs), GPUs (graphics processing units), reduced instruction set computers (RISC), general-purpose processors (GPP), microprocessors, gate arrays (e.g., FPGAs), PLDs, reconfigurable computer fabrics (RCFs), RPDs (such as e.g., RFDs) array processors, secure microprocessors, and application-specific integrated circuits (ASICs). Such digital processors may be contained on a single unitary IC die, or distributed across multiple components.

As used herein the term "reconfigurable processing device" (RPD) refers without limitation to a device which includes one or more processing elements which can be reconfigured or reprogrammed for different purposes or functions. One implementation or species of an RPD is an RFD (reconfigurable fabric device), wherein a fabric-like architecture of multiple processing elements is utilized.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives (e.g., hard disk drives (HDD), solid state drives (SDD)), Flash drives, DVR device, memory, RAID devices or arrays, optical media (e.g., CD-ROMs, Laserdiscs, Blu-Ray, etc.), or any other devices or media capable of storing content or other information, including semiconductor devices (e.g., those described herein as memory) capable of maintaining data in the absence of a power source.

As used herein, the term "Wi-Fi" refers to, without limitation and as applicable, any of the variants of IEEE Std. 802.11 or related standards including 802.11 a/b/g/n/s/v/ac/ad/av/ax/ay/ba/be or 802.11-2012/2013, 802.11-2016, as well as Wi-Fi Direct (including inter alia, the "Wi-Fi Peer-to-Peer (P2P) Specification", incorporated herein by reference in its entirety).

As used herein, the term "wireless" means any wireless signal, data, communication, or other interface including without limitation Wi-Fi, Bluetooth/BLE, 3G/4G/4.5G/5G/B5G (3GPP/3GPP2), HSDPA/HSUPA, TDMA, CBRS, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A/LTE-U/LTE-LAA, analog cellular, CDPD, satellite systems, millimeter wave or microwave systems, acoustic, and infrared (i.e., IrDA).

Overview

The present disclosure provides, inter alia, methods and apparatus for performing data (e.g., image data) signal processing by utilizing a reconfigurable fabric device or RFD. In one embodiment, the RFD includes a plurality of configurable logic blocks (CLBs) which, when configured for a particular processing operation or task, advantageously provide some attributes of both software and hardware implementations; i.e., both flexibility/reprogrammability, and processing speed.

In one exemplary approach, the steps of a normal image data processing chain or pipeline are implemented successively on the same RFD according to a slotted protocol. The reconfigurable fabric is physically reconfigured, at different stages of the multi-process operation, to operate as different processing devices. The system does not require the presence of multiple application-specific processing chips (and their individual packages and interconnects) to perform the multi-processing operations.

Furthermore, the system is advantageously not restricted, post-manufacture, to a particular set of processes (or performance of a set of processes in a particular order), as would be prescribed by an integrated circuit having application specific processing ICs.

Moreover, as opposed to software solutions, reconfigurable devices provide the fast hardware-based processing often required in image data processing to enhance e.g., user experience aspects of using the host imaging device. The host device may in some applications advantageously be smaller in size and consume less electrical power (and hence prolong battery life in mobile devices) than comparable solutions utilizing multiple discrete chips.

DETAILED DESCRIPTION OF EXEMPLARY EMBODIMENTS

Exemplary embodiments of the apparatus and methods of the present disclosure are now described in detail. While these exemplary embodiments are described in the context of the specific imaging device, integrated circuit, and/or memory configurations, the general principles and advantages of the disclosure may be extended to other types of devices, processors, ICs, and/or memory technologies, the following therefore being merely exemplary in nature.

It will also be appreciated that while described generally in the context of a consumer device (e.g., within a camera device, video codec, or cellular phone or tablet), the present disclosure may be readily adapted to other types of devices including, e.g., professional camera or imaging devices (e.g., for cinematic production uses), server devices, Internet of Things (IoT) devices, and/or for personal, corporate, or even governmental uses such as e.g., low-orbit imaging or reconnaissance platforms (e.g., satellites), or other types of space vehicles. Yet other applications will be appreciated by those of ordinary skill given the present disclosure.

Other features and advantages of the present disclosure will immediately be recognized by persons of ordinary skill in the art with reference to the attached drawings and detailed description of exemplary embodiments as given below.

Imaging Apparatus

Figure 2A:
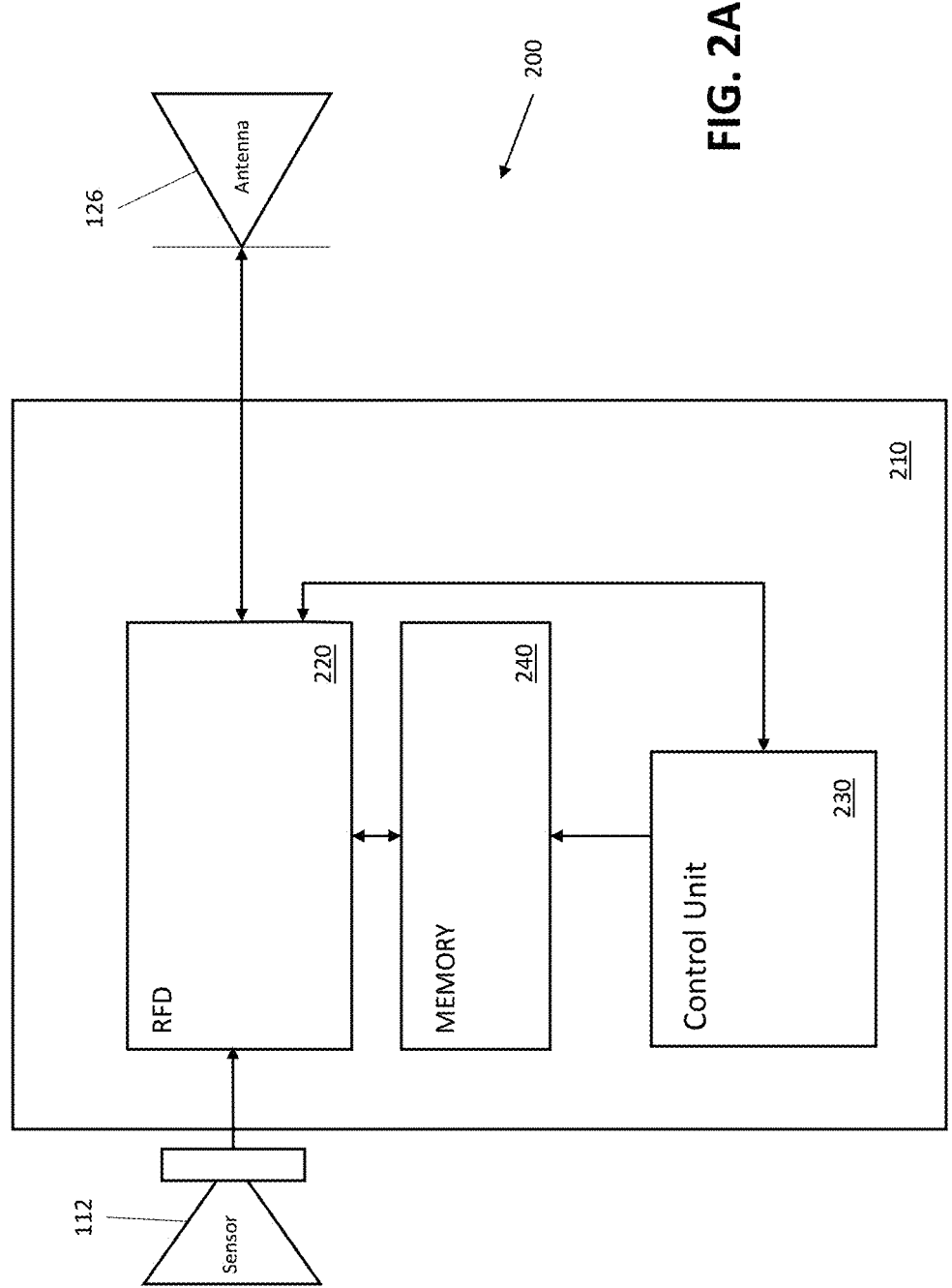
FIG. 2A is a block diagram illustrating one embodiment of an image capture and processing device, including a reprogrammable fabric device (RFD), according to various aspects of the present disclosure.
Figure 2B:
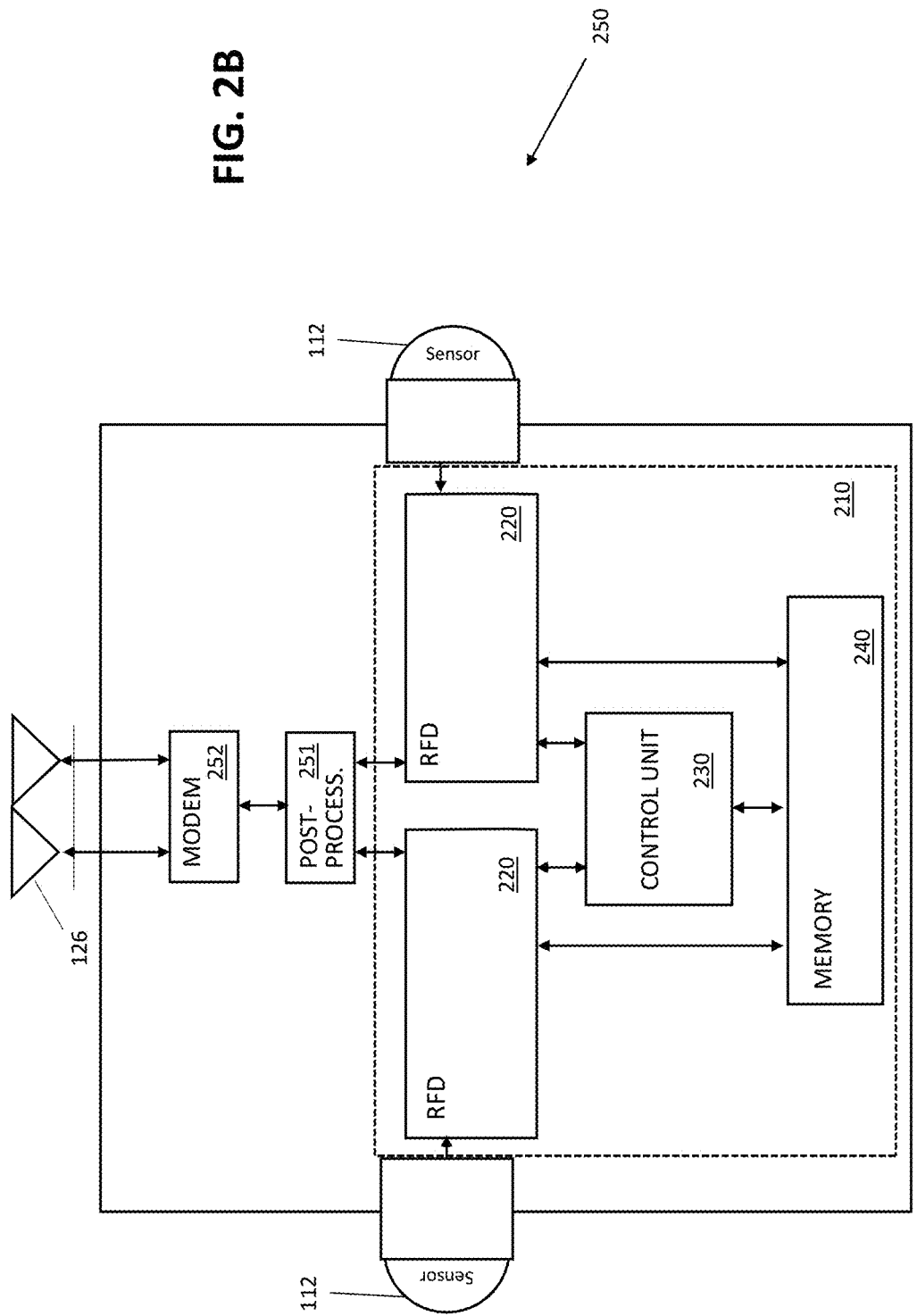
FIG. 2B is a block diagram illustrating another embodiment of an image capture and processing device, including multiple "fisheye" or hemispherical sensors and RFDs arranged in a back-to-back configuration.
Figure 2C:
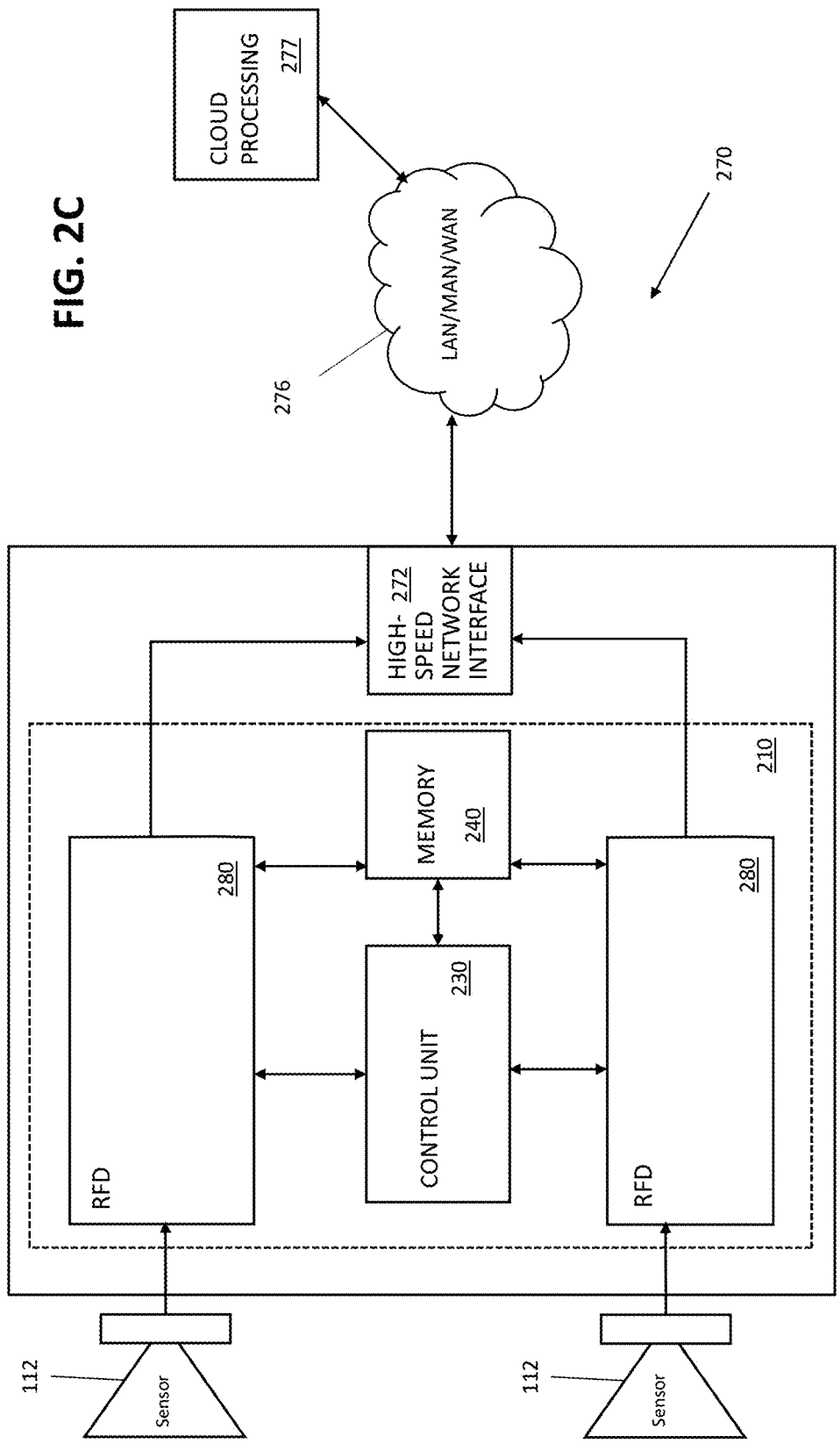
FIG. 2C is a block diagram illustrating another embodiment of an image capture and processing device, including multiple sensors and RFDs and a high-speed interface for connection to e.g., a LAN/WAN/MAN.

Referring now to FIGS. 2A-2C, exemplary embodiments of the image capture device and associated apparatus are shown and described in detail. It will be appreciated by those of ordinary skill given this disclosure that other configurations and/or combinations of features may be utilized consistent with the present disclosure, the embodiments of FIGS. 2A-2C being merely illustrative.

FIG. 2A illustrates a first exemplary image device 200 according to aspects of the present disclosure. The device 200 includes an image sensor 112, an antenna 126, and an integrated circuit 210. The integrated circuit 210 includes a reconfigurable fabric device (RFD) 220, a control unit 230, and a memory unit 240 (e.g., DRAM). As described in greater detail subsequently herein, the reprogrammable fabric device 220 can be configured to operate as various types of circuits, based on data/commands it receives from the control unit 230 (and other sources such as internal code, depending on configuration). For example, the reconfigurable fabric device can be configured as an image signal processing (ISP) circuit, a deep-learning accelerator (DLA) circuit, a baseband processing (BBP) circuit, etc., depending on which configurable logic blocks (CLBs) are utilized; see discussion of FIG. 9 provided subsequently herein.

The control unit 230 may be a digital processor or microcontroller containing circuit configuration information, a clock, switching/coordination logic, and other logic and/or algorithms configured for coordinating the execution of the various different processes on the RFD 220. Although one RFD, one control unit, and one memory unit are illustrated, it will be recognized by an artisan that multiple RFDs, control units, and memories can be implemented in various configurations, with FIGS. 2B and 2C depicting just some of the possible alternate configurations consistent with the broader principles of the disclosure.

Moreover, integration or separation of the various functional components shown may be utilized. For instance, in one embodiment, the sensor IC 112 may be integrated with the reconfigurable fabric device 220, including as part of the IC 210. The integrated circuit 210 likewise may be part of a larger integrated circuit package or chipset. The controller logic 230 may be integrated within the memory or RFD functions as well, such as within an FPGA-based device which has a RISC or other processor core integrated therein to execute controller code.

In one implementation, a field programmable gate array (FPGA) integrated circuit is used as the basis for the RFD. As is known, FPGAs generally may be designed to be configured and/or reconfigured post-manufacture. An FPGA typically contains input/output electrodes, configurable logic blocks (CLBs), and switching matrix interconnects. FPGAs can also include internal memory devices, microprocessors, and other elements that might aid in the. Modern reconfigurable fabric devices (e.g., FPGA-Accelerator Boards) are increasingly fast and efficient, and can support extremely large and complicated applications, including encryption, compression, and acceleration applications. In the exemplary implementation described with respect to FIG. 2A herein, the FPGA device is further configured for "fast switch" reconfiguration; i.e., under control of the controller logic 230, the RFD may be rapidly reconfigured (such as within a prescribed number of clock cycles, including conducting some operations in parallel—see discussion of FIG. 3A herein) so as to avoid any significant temporal or efficiency penalty versus a non-reconfigurable device.

FIG. 2B is a block diagram illustrating another embodiment of an image capture and processing device, including multiple "fisheye" or hemispherical sensors 112 and RFDs, the sensors arranged in a back-to-back configuration such as for 360-degree viewing. In this embodiment of the architecture 250, the memory 240 and control logic 230 are in effect shared by the two RFDs 220, and a post-processing logic module 251 is utilized to post-process the image data processed by the respective RFDs 220. For example, such post-processing may include joining or algorithmically "stitching" of the images derived from each sensor/RPD chain together into a common image after they have been suitable pre-processed (including conversion from RAW format, Bayer filter and mosaic operations, etc. The post-processed image may then be transmitted off-device 210 via the modem 252 (e.g., 3GPP 4G or 5G interface, Wi-Fi 802.11ax or 802.11be interface, or the like).

FIG. 2C is a block diagram illustrating another embodiment of an image capture and processing device, including multiple sensors and RFDs and a high-speed interface for connection to e.g., a LAN/WAN/MAN. This architecture 270 may be useful for e.g., cinematic or other such professional grade movie cameras which utilize multiple sensors/imaging devices, such as for creation of panoramic or perspective views (including composites) such as during cinematic movie production. As with the embodiment of FIG. 2B, this architecture 270 utilizes separate RFDs 280 supporting each imaging sensor (or sensor array), and a common control unit 230 and memory 240, although it will be appreciated that dedicated controllers/memory devices may be used. As shown, a high-speed network data interface 272 is also coupled to the output of each RFD 280, thereby enabling communication of processed data (including data which is incomplete in its processing) off of the device, such as to a LAN/MAN/WAN 276 such as the internet and cloud processing entity 277 such as a remote server or server "farm". The interface 272 may be wireline (e.g., GbE, Mellanox InfiniBand, or other), or wireless (e.g., low-latency 5G NR), and may be used in some cases to support off-device processing of data, such as for deep learning accelerator (DLA) applications, so as to reduce on-device processing load. For instance, in one such variant, interim results from one or more stages of the processing "pipeline" discussed subsequently herein can be transmitted off-device to a target DLA, image combination/stitching, or other process for computation and return of results to be used in a subsequent processing stage of the RFDs 280. In one such approach, the controller logic 230 is configured to determine processing requirements in advance and offload independent processing (i.e., that which does not rely on other processing results) to the cloud entity such that results may be timely returned for use in a subsequent processing stage, such as via a 5G NR low-latency connection.

In one embodiment, the memory device 240 of FIGS. 2A-2C is configured as a dynamic random-access memory (DRAM) integrated with the one or more reconfigurable fabric devices (RFDs) 220 or 280. In another embodiment, the memory is a separate memory unit (or units) in data communication with the RFD(s). For instance, in some configurations (e.g., FIG. 2C), a single memory device may be shared by two or more RFDs, such as where different portions or virtual/physical address spaces of the memory are partitioned for use by only on RFD. Alternatively, in some configurations, parts of the memory address space may be shared by the different RFDs, such as on a time-sharing or other basis, so as to inter alia, reduce the total storage allocation required by the RFDs collectively. In some other configurations, each different process of the processing "pipeline" (see e.g., FIGS. 3 and 3A, discussed below) may be allocated its own dedicated memory space.

In other embodiments, so-called "characterized memory" devices such as those described in co-owned and co-pending U.S. patent application Ser. No. 16/276,461, filed on Feb. 14, 2019, and entitled "METHODS AND APPARATUS FOR CHARACTERIZING MEMORY DEVICES", U.S. Ser. No. 16/276,471, filed on Feb. 14, 2019, and entitled "METHODS AND APPARATUS FOR CHECKING THE RESULTS OF CHARACTERIZED MEMORY SEARCHES", U.S. Ser. No. 16/276,489, filed on Feb. 14, 2019, and entitled "METHODS AND APPARATUS FOR MAINTAINING CHARACTERIZED MEMORY DEVICES", each of the foregoing incorporated herein by reference in its entirety, may be used as all or part of the memory device 240 of the RFDs 220. As but one example, certain operations performed by the different constituent processing stages of the RFDs may not require fully JEDEC-compliant memory (or that compliant with a prescribed level of performance, such as BER lower than a prescribed value such as e.g., $10^{-18}$), and as such, the controller logic 230 may be configured to selectively utilize those memories or portions of memory for such operations. Such characterized memory may be integrated within the RFD(s), and/or operate as external memory which is accessed by the RFD. For instance, if during fabrication a portion of an RFD memory does not pass compliance testing, that portion may be programmed within the controller as being available for error-tolerant applications only (e.g., those for which a BER of say $10^{-9}$ or $10^{-10}$ will have little or no perceptible effect).

Figure 3:
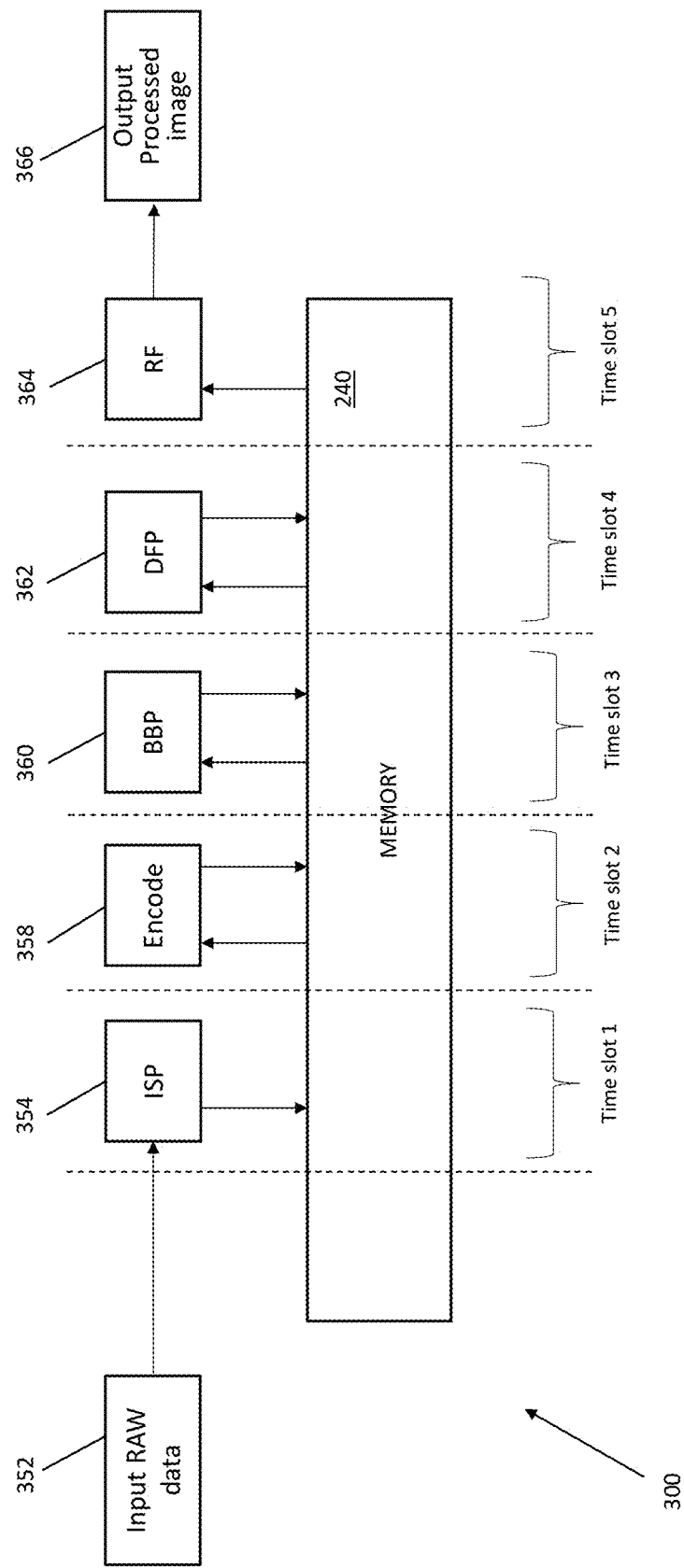
FIG. 3 is a graphical illustration of one embodiment of a multi-step image processing method that may be used with the devices of FIGS. 2A-2C, according to aspects of the present disclosure.

FIG. 3 shows an exemplary time-division based image data processing method 300 which can be implemented using the systems of e.g., FIGS. 2A-2C. The reconfigurable fabric device 220 is used to perform multi-process operations, including here five distinct processes: image signal processing (ISP) 354, encoding 358, baseband processing (BBP) 360, digital frequency processing (DFP) 362, and radio frequency processing (RFP) 364. It will be appreciated that while the different time "slots" (1-5) are shown in a prescribed order and relationship to certain processing tasks, this configuration is but one example, and the types and/or order of processing may in some cases be changed or permuted.

During time slot 1, RAW data that has been collected by the sensor(s) of an image capture device is input 352 and processed 354 by the reconfigurable fabric device (RFD) 220 operating as an ISP circuit, and the result is stored to memory 240.

As a brief aside, many CCD or CMOS imaging devices have some level of pixel non-uniformity; each pixel in the array has a slightly different sensitivity to light, typically within 1% to 2% of the average signal. This non-uniformity can be reduced using a number of techniques, such as calibration of the image with a flat-field image.

Moreover, some arrays have so-called "stuck" pixels, which may always be on or off. These pixels can be readily identified, and their output replaced with e.g., filtered values.

Yet another aspect of such sensors to be considered is so-called "dark floor;" due to the fact that increased temperature adds noise to the output of the array, the true floor of the array is unknown. As such, sensors often utilize a ring of covered pixels around the exposed sensor—the output of these covered pixels can be subtracted from that of the remaining pixels, in effect calibrating for the thermal floor of the device when no light is incident upon it.

Hence, RAW-processed data can be broadly considered for purposes of this disclosure as being "raw" (original or unprocessed) data from the sensor which has had some pre-processing for e.g., correction of physical phenomenon or artifacts such as the foregoing.

Image signal processing (ISP) performs a variety of sensor-specific processing generally associated with human perception (i.e., what a human finds visually desirable). These may include, inter alia, (i) demosaicing (interpolation of RGB for each pixel); (ii) autofocus, autoexposure, auto-white-balance; (iii) corrections for lens imperfections; and (iv) noise reduction, filtering, and HDR.

As such, the ISP phase of the method 300 takes this RAW data and further processes the data, such as e.g., to produce demosaiced data, Bayer transformation/color filter array processing, for compression, etc., depending on the design and configuration of the sensors and the desired ISP functionality.

In some variants, the RFD is configured as an ISP circuit by default (e.g., its "zero conf" or baseline configuration on initiation), before the RAW data is transferred to the RFD. Alternatively, the initial processing configuration may be determined by operating mode or other inputs obtained by the control logic 230 at initiation. For instance, if the user selects an application-layer function or mode of operation such as "preview" which may not require any DLA functionality (or limited ISP functionality), or alternatively may benefit from having the DLA processing functionality occur first (see discussion of FIG. 7 below), the RFD may assume a configuration consistent therewith, such as by initializing the RFD as a DLA processor or reduced-scope ISP.

In another variant, the RFD is not initially configured as an ISP circuit; in this case, the control unit 230 may first store the RAW data to memory 240, reprogram the RFD 220 as an ISP circuit or other desired configuration, and then prompt the RFD (operating as e.g., an ISP) to read out and process the RAW data from memory. After the ISP processes 354 the RAW data, the ISP-processed result is stored into memory 240.

Referring again to FIG. 3, during Time slot 2, the control unit 230 reconfigures the RFD 220 to operate as an encoder. The RFD (as encoder) reads out the DLA-result from memory, performs encoding operations 358 (such as e.g., to apply a lossy or non-lossy encoding/compression algorithm to the data), and writes the encoded result back to memory. During Time slot 3, the control unit 230 reprograms the RFD 220 to operate as a BBP circuit, the RFD (as BBP) reads out the encoded result from memory, performs BBP operation 360, and writes the BBP-result back to memory. During Time slot 4, the control unit 230 reprograms the RFD 220 to operate as a DFP, the RFD (as DFP) reads out the BBP-result from memory, performs DFP operation 362, and writes the DFP-result back to memory. Finally, during Time slot 5, the control unit 230 reprograms the RFD 220 to operate as a radio frequency processor (RFP), the reprogrammable fabric chip (as RFP) reads out the DFP-result from memory, performs RFP operation 364, and uses a transmitter (e.g., antenna) to transmit the result per step 366.

The foregoing multi-process operation is coordinated by the control unit logic (processor) 230, which feeds the appropriate circuit configuration information to the RFD 220 and instructs the RFD 220 to read/write data to the memory 240, at the appropriate times. In one embodiment, time is dynamically allocated to each time slot; i.e. the control unit 230 implements the next stage of the process once it receives a signal or data indicative that that the previous stage has been completed. As such, the duration of each slot may vary from that of the others, depending on the nature of the processing being conducted, the data being processed, etc. Program control elements such as spin-locks, locks, mutexes, etc. may also be implemented so as to ensure required data from operations is returned to permit performance of the next stage or step.

In another embodiment, the time (e.g., in milliseconds or clock cycles) allocated to each time slot is calculated in advance, based on (i) time expected for programming/reprogramming the RFD 220 to a particular configuration, and (ii) time expected for the RFD 220 to finish a processing of data using that configuration. This expected time may be for instance an estimate which is derived based on parameters such as the size/configuration of the RAW data, type and/or configuration of sensor, processing element/pipeline configuration, or even historical data obtained from prior processing of data by the apparatus. For instance, in one implementation, a prescribed number of clock cycles (derived from a local clock oscillator on-chip) is allocated to each different time slot based on estimates generated by a scheduler operative to execute on the controller 230 (or even a CPU within the host imaging device).

In another embodiment, different methods of time allocation are used for different time slots; e.g., the mechanism used for determination of the duration of a given time slot may be heterogeneous with that used for another time slot, based on e.g., the identity of the processing performed in each respective slot. As such, some types of processing may be more predictable or amenable to one type of slot estimation mechanism than other types which are more unpredictable (and hence may e.g., use the previously described "lock step" or completion-first methodology for one or more slots or portions thereof). This allocation of mechanisms may also be dynamic in nature; e.g., such as where the controller logic 230 dynamically allocates one of a plurality of available mechanisms to each slot, and calculates the slot durations based thereon (as applicable).

It will be appreciated that the process of FIG. 3 uses the integrated circuit having one or more reconfigurable fabric devices (RFDs) 220 (as in FIGS. 2A-2C) to replicate the functions of the e.g., multiple processing chips (as in FIG. 1A) during multiple separate time slots. However, in certain embodiments, methods utilizing the integrated circuits of FIGS. 2A-2C may combine, skip, replace and/or rearrange one or more of the above processing steps. Moreover, as described elsewhere herein, some of the processing steps (or portions thereof) may be offloaded to other RFDs and/or other processing entities, including e.g., network attached or "cloud" processing entities, depending on the particular configuration and application.

Figure 3A:
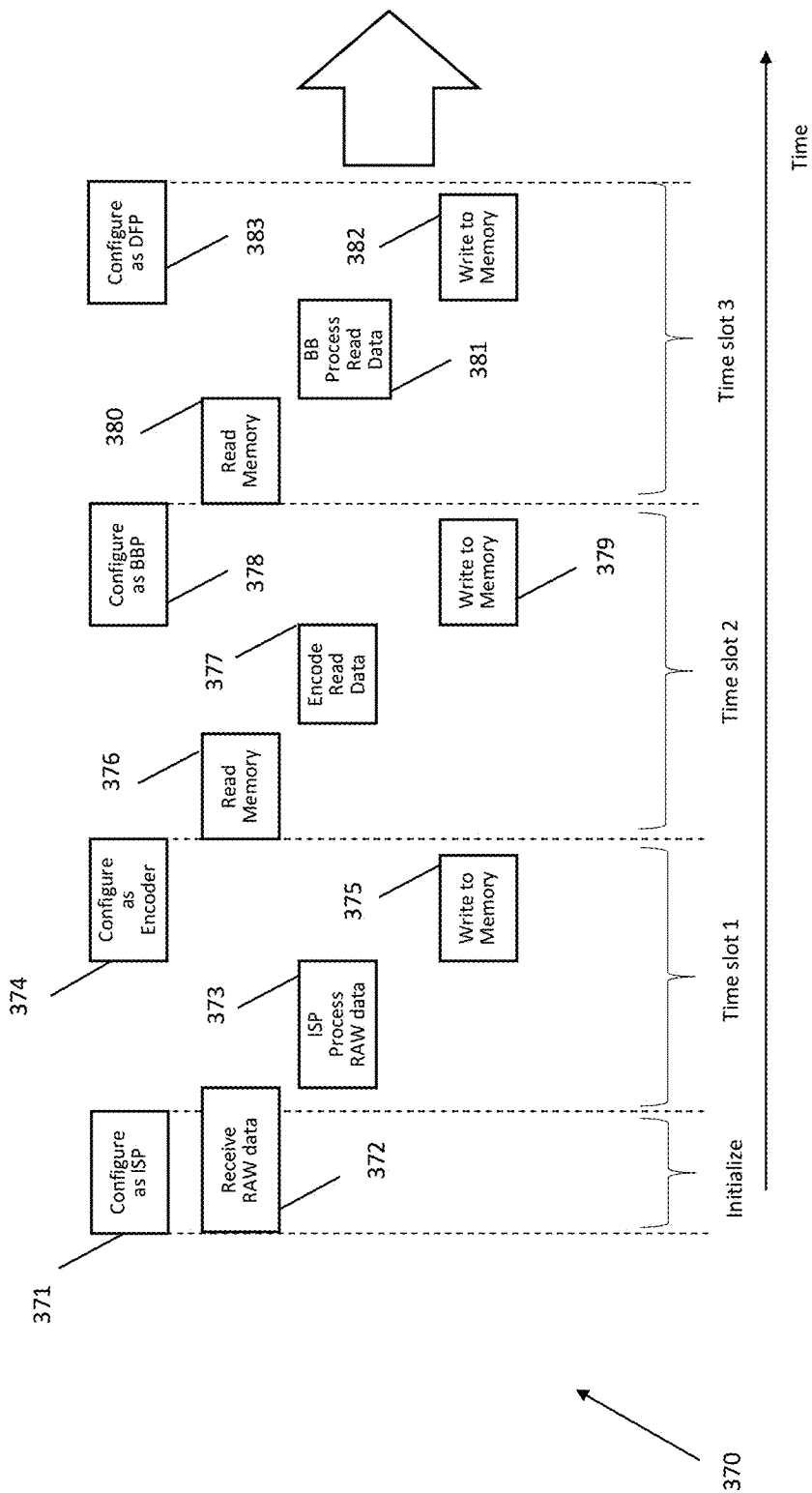
FIG. 3A is a timing diagram illustrating one exemplary implementation of the method of FIG. 3 using an RFD.

FIG. 3A is a timing diagram illustrating one exemplary implementation of the method of FIG. 3 using an RFD. As shown in FIG. 3A, the process 370 utilizes a series of sequential and contemporaneous individual operations to execute the overall image data processing method of FIG. 3. As will be appreciated, the different operations may be "pipelined" to various depths as shown, such that different portions of a given RFD may be utilized concurrently. For instance, memory access circuitry enabling access and reading of data stored in certain areas of the memory 240 may be operated in parallel with some other operations, such as re-configuration of the logic functions or blocks of the RFD to achieve a desired processing configuration for processing the data then being retrieved from memory, as shown.

In the example of FIG. 3A, the RFD 220 is first configured as an ISP per process 371 during an initialization period or phase. Contemporaneously therewith, RAW data is received (whether from the generating sensor(s) or a storage location) per process 372. So-called "runtime configuration" may be used in one approach, such as where portions of the RFD continue to operate, and only select portions are reconfigured dynamically (such as via introduction of a bitstream on one or more control inputs) versus compile time reconfiguration (CTR) which effectively requires a rest of the entire device.

As a brief aside, there are generally two primary approaches to run-time reconfiguration of reprogrammable logic devices such as FPGA exist: Partial Reconfiguration (PR) and Software Programmable Reconfiguration (SPR). The PR approach generally necessitates an FPGA architecture that has been designed to support reconfiguration regions or zones. In contrast, in the SPR approach, FPGA components are implemented as flexible building blocks that are controlled through software code (e.g., running on an embedded processor or a host processor). Partial Reconfiguration allows design modules to be in effect swapped out "on the fly." This capability allows resources within the device to be timeshared (reconfigured) while other functions continue to operate. A partial bitstream must be created for programming each different region. One main advantage of this approach is that critical operations can be preserved, while only part of the FPGA device is reconfigured, as opposed to a complete reconfiguration of the FPGA, which in effect requires a chip-wide reset (and hence interruption of the foregoing critical ongoing functions). However, FPGAs using PR are typically limited in the number of reconfiguration regions and may impose significant additional timing constraints.

In contrast, Software Programmable Reconfiguration is a designed-in capability which allows for alteration of digital logic flows through software commands. It utilizes a more software-based approach and models the FPGA as a System-on-Chip (SoC) with peripheral infrastructure in place. An application is separated into two processing planes (control and streaming), each utilizing a common interface standard for component interconnect. The control plane used for control, (re)configuration, and in some cases memory management. Routing of control/configuration and status data is accomplished using a control fabric. The streaming data plane in contrast uses a streaming data fabric that allows for e.g., point-to-point data transfer between individual components.

Generally, the functionality of an FPGA can be abstracted to a higher level using SPR, and design and hardware reuse is promoted, thereby enhancing flexibility and multi-application configurations. As with microprocessors, this type of high-level design is highly scalable, allowing for an increase in application complexity, mapping directly to an ASIC flow, and resulting in a significant increase in overall design portability.

In the exemplary configuration of FIGS. 3 and 3A, the reprogramming of the various CLBs within the RFD (see discussion of FIGS. 8 and 9 below) may be accomplished using either approach depending on how the RFD is designed.

During the first time slot (1), the ISP function of the RFD processes the retrieved data per process 373, and writes the results to memory per process 375, while simultaneously the RFD logic blocks are configured as an encoder (process 374).

During time slot 2, the memory is again read per process 376 to obtain the data (or portions thereof) written per process 375, and that data processed by the encoder (process 377). The results are written to memory (process 379), and contemporaneously the RFD is reconfigured as a BBP (process 378). Similar steps 380-383 are then applied for processing of the read (encoded) data by the BBP process and subsequent reconfiguration and memory write. The process then continues on to slots 4 and 5 (not shown in FIG. 3A for clarity).

It will be appreciated that while a generally consistent or symmetric process of (i) read data; (ii) process data, and (iii) write processed data and reconfigure, is shown for each of the first through third time slots of FIG. 3A, heterogeneous approaches may be used in each. For example, contemporaneous write and reconfigure operations may be used in one time slot, whereas sequential or lock-step processes may be used in another time slot. Similarly, reconfiguration of the logic in a given stage may feasibly start while the processing within that same time slot is still underway, such as where logic blocks which are no longer required for processing in the current stage/slot are reconfigured while the other (required) blocks are still being used.

Moreover, while not explicitly shown in the example of FIG. 3A, certain timing criteria such as e.g., minimum delay windows or offsets, may be imposed. As can be appreciated by those of ordinary skill in the art given the disclosure, at a fine level of granularity, the timing relationships of the various processes of FIG. 3A may be complex and dependent upon individual components and signals, such as where the memory 240 utilizes prescribed phases for e.g., address signals, read/write signals, pre-charge signals, etc., which may be aligned to one or more clock signals within the device.

Figure 4:
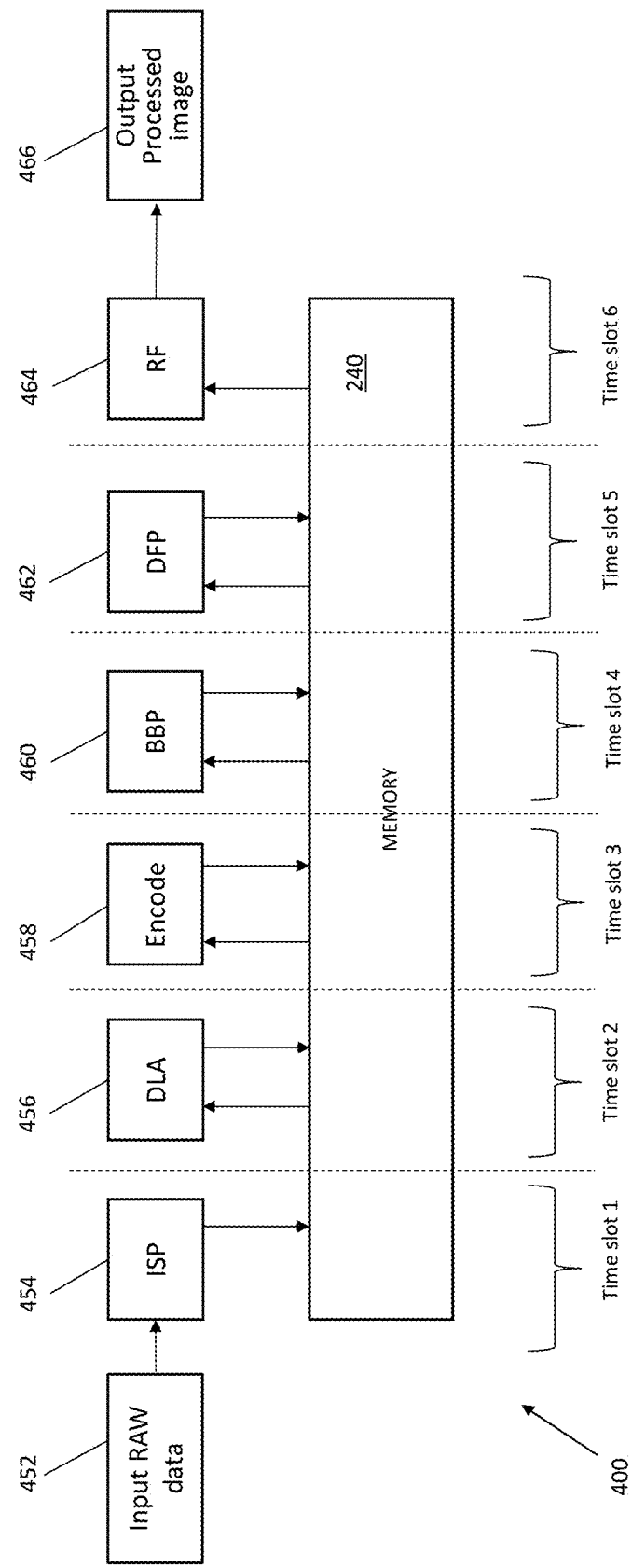
FIG. 4 is a graphical illustration of another embodiment of a multi-step image processing method that may be used with the devices of FIGS. 2A-2C, according to aspects of the present disclosure.

FIG. 4 is a graphical illustration of another embodiment of a multi-step image processing method that may be used with the devices of FIGS. 2A-2C, according to aspects of the present disclosure. As in the embodiment of FIG. 3, input data (e.g., RAW data) is produced and received 452, and processed by the ISP function 454, and written to memory during Time slot 1. However, during Time slot 2, the control unit 230 reconfigures the RFD 220 to operate as a deep learning accelerator (DLA) circuit.

As a brief aside, a deep learning accelerator (DLA) may sequentially and in-order transform data through many "transformation layers." For example, in a deep learning system, the first representational layer may abstract the pixels in a matrix and encode edges; the second layer may compose and encode arrangements of edges; the third layer may encode a nose and eyes of a human subject; and the fourth layer may recognize that the image contains a face.

Returning to FIG. 4, the RFD (as DLA) reads out the ISP-result from memory, performs the DLA operation 456, and writes the DLA-result back to memory 240. During Time slot 3, the control unit 230 reprograms the RFD 220 to operate as an encoder. The RFD (as encoder) reads out the DLA-result from memory, performs encoding operation 458, and writes the encoded result back to memory. During Time slot 4, the control unit 230 reprograms the RFD 220 to operate as a BBP circuit, the RFD (as BBP) reads out the encoded result from memory, performs BBP operation 460, and writes the BBP-result back to memory. During Time slot 5, the control unit 230 reprograms the RFD 220 to operate as a DFP, the RFD (as DFP) reads out the BBP-result from memory, performs DFP operation 462, and writes the DFP-result back to memory. Finally, during Time slot 6, the control unit 230 reprograms the RFD 220 to operate as a radio frequency processor (RFP), the reprogrammable fabric chip (as RFP) reads out the DFP-result from memory, performs RFP operation 464, and uses a transmitter (e.g., antenna) to send out the result per step 466.

Figure 5:
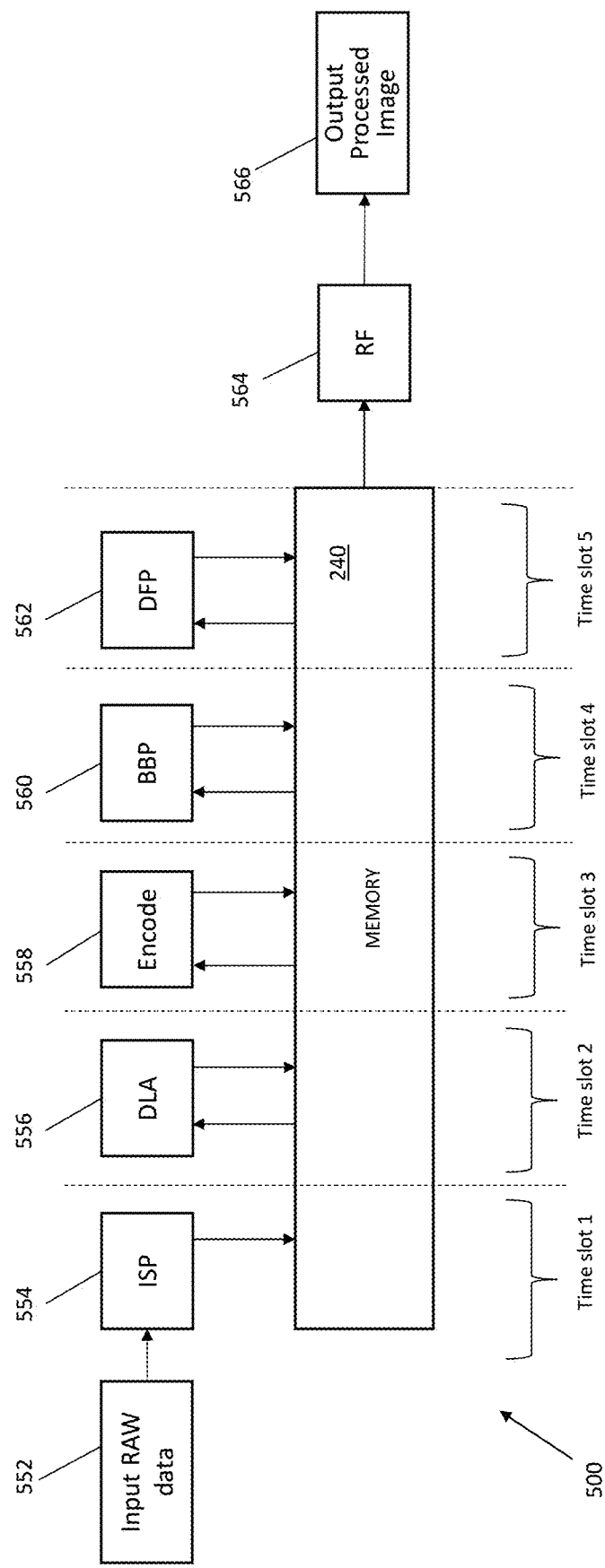
FIG. 5 is a graphical illustration of a further embodiment of a multi-step image processing method that may be used with the devices of FIGS. 2A-2C, according to aspects of the present disclosure.

FIG. 5 is a graphical illustration of a further embodiment of a multi-step image processing method that may be used with the devices of FIGS. 2A-2C, according to aspects of the present disclosure. As shown, the method 500 includes receipt of e.g., the RAW data at step 552, followed by ISP processing 554 at Time slot 1. Next, the ISP output data is retrieved from memory 240 and DLA processing occurs at step 556 (Time slot 2), followed by encoding step 558 in Time slot 3, BBP 560 in time slot 4, and DFP 562 in slot 5. Lastly, the output of the DFP stage is provided to a separate RF chip (step 564), and the processed image output over e.g., a wireless interface. Here, the RF device (step 564) is discrete from the RFD; since many such RF ICs are at the "commodity" level currently (e.g., some Wi-Fi or BLE chips less than $1 USD), it may in some circumstances be advantageous to utilize such commodity chips in place of performing such processing on the RFD.

Figure 6:
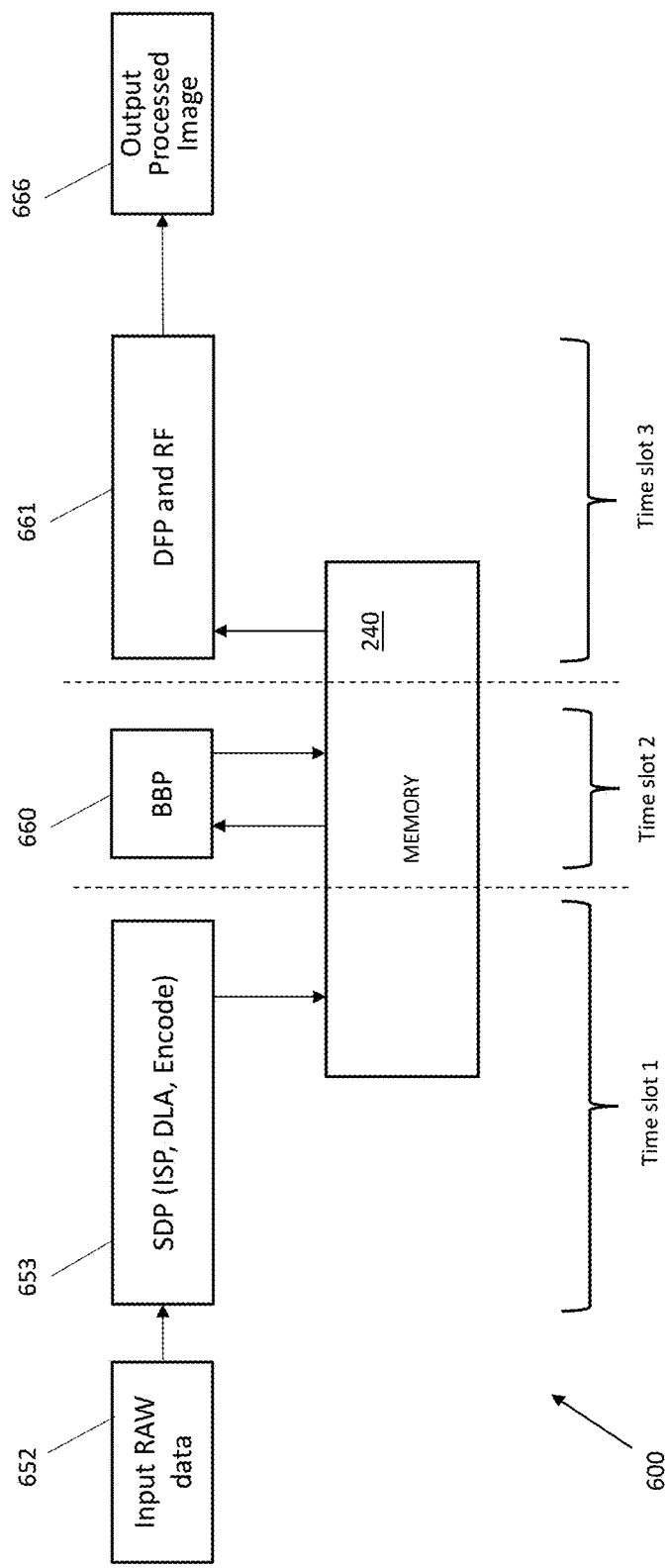
FIG. 6 is a graphical illustration of yet another embodiment of a multi-step image processing method that may be used with the devices of FIGS. 2A-2C, according to aspects of the present disclosure.

FIG. 6 is a graphical illustration of yet another embodiment of a multi-step image processing method that may be used with the devices of FIGS. 2A-2C, according to aspects of the present disclosure. In this embodiment 600, the functions of ISP, DLA, and encode chips are combined into a single sensor data processor (SDP) function of the reprogrammable fabric device (RFD). Additionally, the functions of DFP and RFP are combined into a single DFP/RFP functional unit. That is, the logic for these various processes is aggregated together into functional units within the RFD. This approach allows for, inter alia, some degree of pre-configuration of the functions (including enhanced speed), at the expense of flexibility or re-programmability. The functional units are in one sense more structured and "ASIC-like" in this embodiment; specifically adapted for a smaller subset of possible uses in order to optimize speed. Note however that these functional units are disposed on the same device (RFD) die in the illustrated embodiment, thereby providing reduced board space consumption, external leads, etc. as previously described.

It will be appreciated, however, that depending on the size and scope of the RFD logic block structure, the RFD(s) may contain both the more specialized functional units as in FIG. 6, and the more generic (but flexible) reprogrammable blocks of the prior embodiments. As such, the controller logic (or even a scheduler or other process operative on the CPU of the host imaging device) may be configured to determine which of the two (or more) options to utilize for any particular processing operation. For instance, where a large, processing-intensive data set is to be processed, the "specialized" functional units may be employed to enhance data processing throughput. Factors such as electrical power consumption and others may be considered in such analyses as well.

Referring again to FIG. 6, during Time slot 1, the RFD receives at step 652 RAW format data and performs sensor data processing (step 653, including image signal processing, deep level acceleration processing, and encoding on the image data using a single SDP functional unit configuration). During Time slot 2, the control unit reconfigures the RFD to operate as a BBP circuit; the RFD (operating as BBP) reads out the SDP-result from memory, performs broadband processing 660, and writes the BBP-result back into memory. In Time slot 3, the control unit reprograms the RFD to operate as a combined DFP/RFP "chip"; the RFD (programmed as DFP/RFP) reads out the BBP-result from memory, performs digital and radio frequency processing per step 661, and outputs per step 666 the result to the transmitter.

Figure 7:
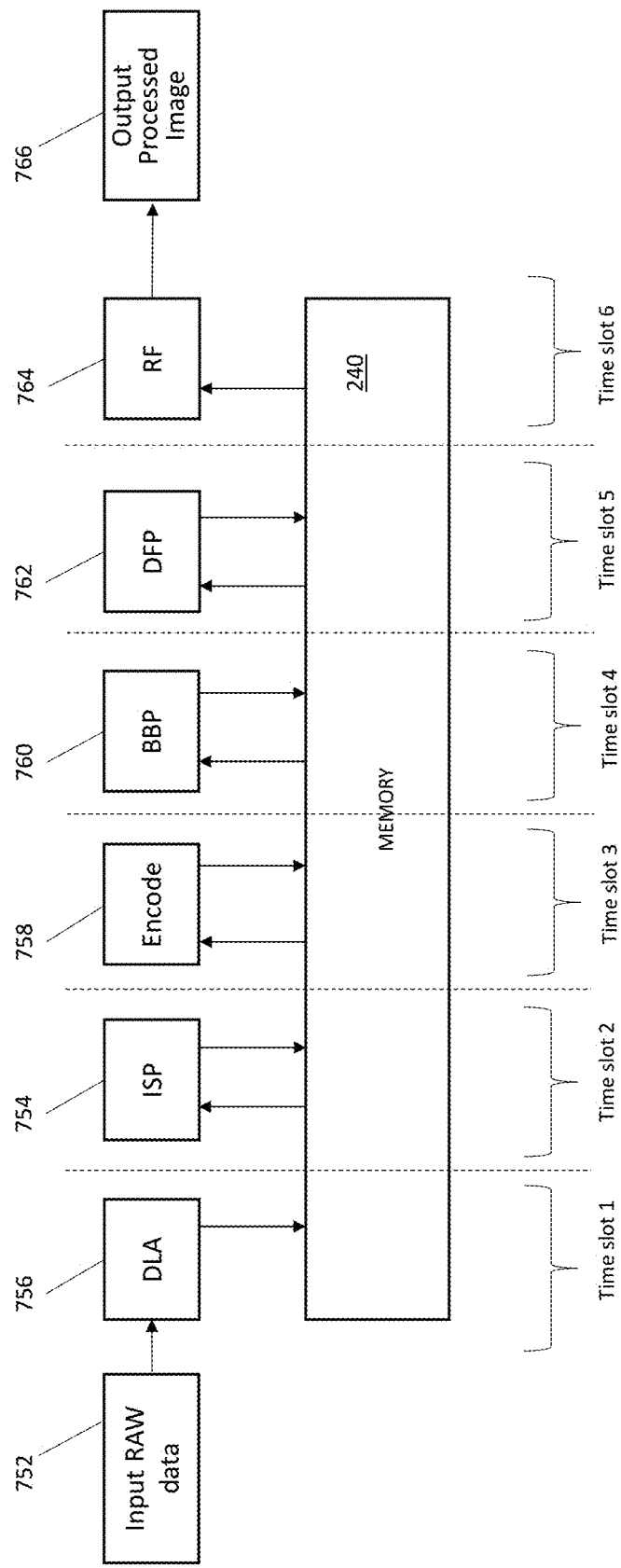
FIG. 7 is a graphical illustration of another embodiment of a multi-step image processing method that may be used with the devices of FIGS. 2A-2C, according to aspects of the present disclosure.

FIG. 7 is a graphical illustration of another embodiment of a multi-step image processing method that may be used with the devices of FIGS. 2A-2C, according to aspects of the present disclosure. The process of FIG. 7 is generally similar to the process of FIG. 5 previously described, except that the ISP and DLA processes have been switched in order.

As a brief aside, ISP is typically the first process performed on image data collected by a sensor (RAW data), so an image capture device employing ISP and DLA might have processing steps, in order:

ISP→DLA→encode or

DLA→ISP→encode

On the other hand, ISP may remove artifacts from image data that may be undesirable for human perception, but may be desirable/useful for deep learning, or add artifacts desirable for human perception, but undesirable for deep learning. Therefore, it might be beneficial to perform DLA directly on RAW data—which preserves most of the information of a captured image—before it has been processed by the image signal processor and/or encoded. As such, the embodiment of FIG. 7 utilizes such an approach. Additional details, methods and apparatus relating to the foregoing that may be used consistent with the various principles of the present disclosure are described in co-owned and co-pending U.S. patent application Ser. No. 16/874,504 filed May 14, 2020 and entitled "METHODS AND APPARATUS FOR PERFORMING ANALYTICS ON IMAGE DATA," previously incorporated herein by reference in its entirety, although it will be recognized that other approaches may be used consistent with this disclosure as well.

As shown, during Time slot 1 of the method 700 of FIG. 7, RAW data 752 that has been collected by the sensor(s) of an image capture device is processed 756 by the reconfigurable fabric device (RFD) 220 operating as a DLA circuit and the DLA output/result is stored to the memory 240. During Time slot 2, the control unit 230 reconfigures the RFD to operate as an ISP circuit. The RFD 220 (as ISP) reads out the DLA-result from memory 240, performs the ISP operation 754, and writes the ISP-result back to memory 240. During Time slot 3, the control unit 230 reprograms the RFD 220 to operate as an encoder. The RFD 220 (as encoder) reads out the ISP-result from memory, performs an encoding operation 758, and writes the encoded result back to memory 240. For Times slots 4-6, the method is identical to that of FIG. 5.

Notably, an integrated circuit of having reconfigurable fabric such as the exemplary devices described herein makes it particularly simple to switch the order of image processing operations (such as, for example, switching ISP and DLA operations as in FIG. 7), without losing the overall efficiency of the process. Contrast this with an IC board having dedicated ASIC chips (e.g., ISP and DLA chips, or a SDP ship), wired for a particular order of steps. If the ISP and DLA processes are implemented using separate chips, a system controller may feasibly be able to use the ISP and DLA chips in an order that is different from what was originally intended by the IC manufacturer.

Reconfigurable Fabric Device (RFD)

Figure 8:
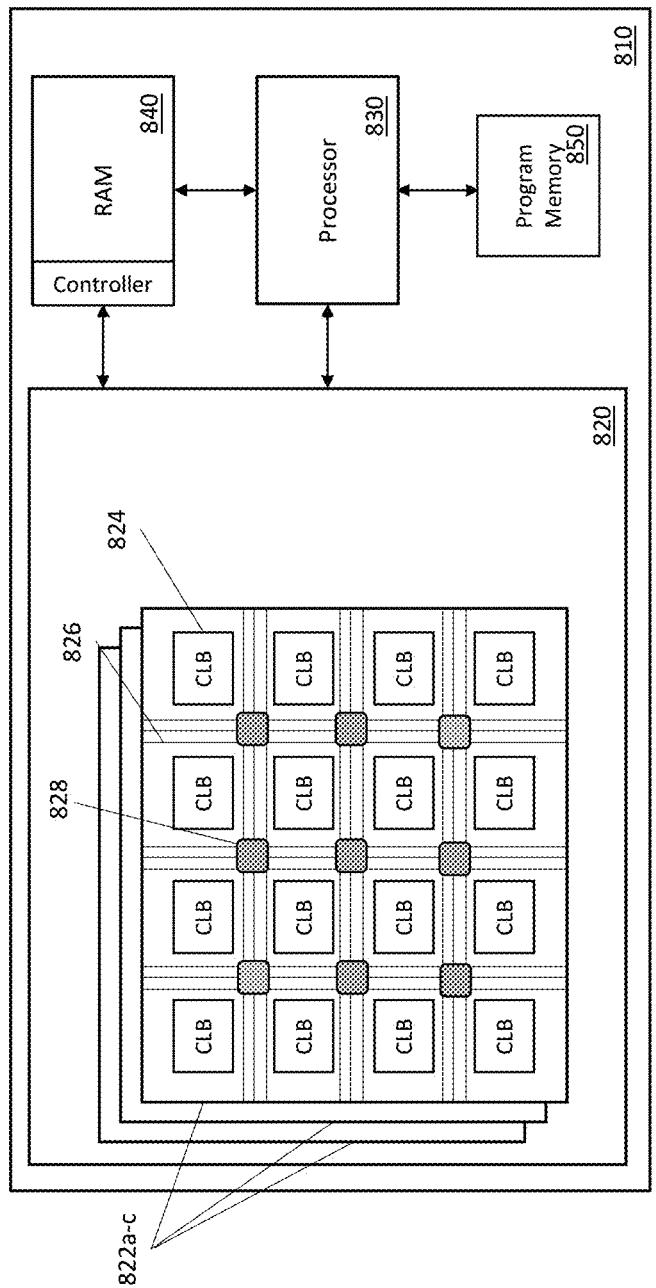
FIG. 8 is a block diagram of one embodiment of a reconfigurable fabric device (RFD), according to various aspects of the present disclosure.

FIG. 8 is a block diagram of one embodiment of a reconfigurable fabric device (RFD) 810, according to various aspects of the present disclosure. This device 810 may for example perform the functions of the exemplary RFDs 220 shown in the embodiments of FIGS. 2A-2C, or be adapted for yet other applications.

As shown, the reconfigurable fabric device 810 of FIG. 8 includes a reconfigurable fabric region 820 of the die including an array 822 (or multiple arrays such as e.g., arrays 822*a-c*) of configurable logic blocks (CLBs) 824 connected through switching matrix interconnects (switch boxes 828 and interconnects or buses 826). Each array (or set of arrays) may be formed on a single layer (2D array) or include multiple stacked layers (3D array) as applicable. The configurable logic blocks 824 include in one embodiment logic elements such as look-up tables (LUTs), flip-flops, registers, and multiplexers, as well as arithmetic functions such as multiply-accumulate stages.

In one embodiment, the reconfigurable fabric device 810 can include one or more memory devices 840 and one or more processors 830 (such as e.g., a RISC core such as an ARM core) with associated program memory 850. The processor 830 facilitates integration of the reconfigurable fabric device with external circuitry and commands, and can include clocking/reset, memory controllers, interconnect components, etc. (although these may also be implemented as separate components or functional units apart from the processor 830, such as the memory controller being integrated with the RAM as shown in FIG. 8)

In one embodiment, the processor 830 and computerized logic stored as computer programs in the program memory 850 may accept fabric configuration information in the form of hardware description language (HDL) inputs, synthesize the HDL information into a corresponding register-transfer level (RTL) design or implementation, and use the RTL to transform the reconfigurable fabric 820 into the desired configuration.

In some embodiments, the RFD may also include local memory such as caches (e.g., L1/L2/L3 caches associated with the processor 830), and other storage devices which can be used to complement or supplement the main RFD memory 840. For instance, it may be more "expensive" from a performance standpoint to write or read some data from the various processing stages to the RFD memory 840 (due to e.g., access/write times associated with the memory 840 and its controller), and as such some data may be stored locally within storage associated with one or more of the CLBs 824 or the fabric 820 in general (not shown). As but one example, intermediate multiply/accumulate operation results, or DLA intermediate results, may be locally stored for ready access until the operations are complete, and only then the final results or output written to the RFD "main" memory 840.

It will also be appreciated that the RFD 810 may be configured to utilize off-die components such as memory and/or controllers which may already exist within the host device. For instance, the host device may have appreciable RAM which can be used for storage of the processing stage results of the RFD. While generally less optimal from a performance standpoint due to the off-die accesses, there may be countervailing considerations which make use of such external components viable. Similarly, in another embodiment, the reconfigurable fabric device does not have its own processor, and an external processor such as a CPU performs HDL to RTL synthesis and programs the reconfigurable fabric 820 directly via e.g., an external package interface (not shown).

It will also be appreciated that while at least partially hardware-based CLBs 824 are used within the embodiment of FIG. 8, the control logic itself need not be rendered in hardware, since the control functions it performs operate on a different time scale that the constituent operations being performed by the CLBs in processing the data, e.g., a DCT or iFFT or de-Bayering or de-mosaicing operation, the latter operations which are orders of magnitude more process-intensive than the control functions themselves. Hence, software-based controller logic such as implemented on the processor 830 may provide suitable performance as well as flexibility and reprogrammability. For instance, the program memory 850 may be externally reprogrammed or "re-flashed" to reconfigure the controller logic for new functions, modify existing functions, etc.

It is also envisioned that hundreds or even thousands of individual CLBs (or more as IC technology advances) may be utilized in the fabric of FIG. 8 in order to provide the functionality described herein.

As previously noted, different CLBs 824 within the fabric may also be heterogeneously configured. For instance, some blocks may be more "ASIC-like" in terms of dedicated hardware/circuit configurations that are optimized for certain types of operations, while others are more reconfigurable and utilize software-based elements for execution of the operations. Different types of MAC and other units may be used as well. For instance, as is common in GPUs used for e.g., DLA applications, SIMT/SIMD-type architectures are utilized primarily to enhance speed and parallelism, with no concurrent program branching or similar mechanisms commonly found in RISC or CISC types of architectures. Hence, in one variant, a SIMT/SIMD "array" 822 is used as one portion of a two- or three-dimensional device, while other arrays 822 are configured under other processing paradigms.

Moreover, in applications where multiple RFDs are used and communicative with e.g., a common controller and memory, the two (or more) RFD configurations may be heterogeneous r asymmetric, such as where on RFD is optimized for a certain type or set of operations, and another optimized for other operations. In this fashion, the two or more RFDs are complementary to one another, and a common controller/scheduler may selectively schedule operations on one or the other in order to leverage such complementary functionality. Such solution may, for example, return results from a processing pipeline or series of operations faster than if an individual RFD was utilized, not only because some operations are performed in parallel with others, but also the operations are selectively performed on more optimized hardware than would be used on a single "generic" RFD.

As previously alluded to, in application where multiple RFDs 810 (or RFD fabrics 820) are utilized, the controller logic of each device (and/or a host scheduler where used) may coordinate with that of the other device(s) so as to enable offload or sharing of processing tasks between the devices so as to better optimize performance. For instance, in one embodiment, a scheduler or other such process operative to execute on one (or both) of the controllers (e.g., processors 830 in FIG. 8) determines which RFD/fabric is used for processing certain tasks, with the source and result data read from/written to a common memory. "Bottlenecks" within the processing pipeline (such as highly processing intensive operations) can be allocated to an idle portion of one of the other RFDs/fabrics by the scheduler, so as to free up another RFD/fabric to perform e.g., portions of subsequent processing tasks which are not dependent on the results of the allocated tasks.

Likewise, as previously referenced, dynamic re-ordering of the stages of the processing may be utilized by the scheduler to increase performance. For instance, a normal processing order may be:

DLA→ISP→encode

However, if permutation of this order (e.g., by performing ISP first) would increase performance without significant penalties on the quality or utility of the resulting processed data (e.g., loss of DLA efficacy due to the ISP removing or filtering important informational components needed by the DLA process), then the scheduler/controller logic may re-order the stages so as to achieve the higher level of throughput performance.

Similarly, user application-layer processes may provide inputs to the scheduler/controller logic which add or eliminate certain requirements and/or available processing configurations. For instance, the user may select via an input device of an exemplary host camera platform a "preview" mode of operation, wherein lesser image quality or resolution (including some artifact) may be acceptable in trade for much faster processing. For instance, a user may not need a 4K or 1080p preview, but rather a much lower resolution image which may include some level of color or motion or other artifact which would otherwise be removed or corrected as part of the ISP or other stage processing if "full" or "high quality" processing mode were being utilized. For instance, a typical Bayer sensor includes twice as many green pixel elements and blue or red (due to the human eye's particular sensitivities), processing to utilize or alternatively compensate for such statistics may not be needed on a preview or in certain parts of a video (such as where the image data is or is not highly saturated, low-light scenes, etc.).

Similarly, as discussed elsewhere herein, some portions or layers of DLA or ML algorithm processing may be unnecessary or undesirable in certain modes of operation, such as where e.g., facial "recognition" (as in recognition that a human face is present) is desired, without the level of clarity or precision necessary to conduct facial identification (i.e., identification of a particular instance or human being from the detected face).

As such, the scheduler/controller logic may reorder, eliminate, add, and/or modify some stages/processes so as to comply with these new lesser (or more stringent) requirements. For example, less iterations of a recursive algorithm may produce suitable results in some modes of operation, while in others more iterations are needed. Likewise, more or less filtering, DLA stages or layers, de-mosaicing or de-Bayering, etc. may be selectively applied by the scheduler/controller logic.

Likewise, for exemplary RF processing, lower MCS (e.g., modulation order reduction from 256 QAM to say 64-QAM) or FEC overcoding may be selectively applied by the RF processing stages of the RFD if link channel estimates (e.g., based on sounding or other data fed back from a receiving UE) indicate high wireless channel quality. As can be appreciated, various wireless protocols such as 3GPP Release 8-14 ("LTE") and Release 15 and beyond ("5G NR"), or 802.11ax or 802.11be, utilize a variety of mechanisms for determination of channel quality and other relevant parameters, which can be fed back to the scheduler/controller logic of the RFD(s) to enable dynamic adjustment of the processing configurations implemented by the RFD(s), including in real time.

Reprogramming Method

FIG. 9 is a logical flow diagram illustrating one exemplary embodiment of a method of programming and operating an RFD according to the disclosure. It will be appreciated that while described generally in the context of a PR-based solution of the type discussed previously herein, the methodology may be readily adapted by those of ordinary skill to other approaches including those based on SPR.

As a first step 902 of the method 900, a processor (e.g., controller unit 230, 830) determines that the RFD 220, 810 needs to perform an operation. This may be, for example, the control processor determining that the RFD needs to perform an ISP operation in response to capture of RAW image data using a sensor indicating that it has obtained the RAW image data. If no reprogramming is required, the logic enters a wait state (step 904) until such reprogramming is required.

In step 906, the controller unit obtains circuit configuration information (e.g., for an ISP processing circuit configuration) for the RFD, such as in a hardware definition language (HDL). Note that this configuration data may be internally stored in the control unit (e.g., an attached program or data memory) or may be provided by a source external to the integrated circuit, such as via network or bus interface.

In step 908, the HDL information is synthesized into a register-transfer level (RTL) design, i.e. the physical circuit description of the circuit configuration. The synthesis is performed in one embodiment by the control unit or another internal processor of the RFD, such as when the controller is implemented as a RISC core. Alternatively, the description may be generated off-chip and provided to the RFD 210, 810 via e.g., a bus interface.

In step 910, the reconfigurable fabric is physically changed (mapped) to match the RTL design. This may involve for example applying different bitstreams to the various functional blocks or units being reconfigured.

In step 912, the control unit logic instructs the programmed RFD to perform an operation. For example, the ISP-configured RFD may be instructed to access RAW image data and perform image signal processing (ISP) on the RAW image data. The RAW image data may be provided directly from a sensor or stored in memory as previously described.

In step 914, the control unit logic determines whether the RFD needs to be reprogrammed in a different circuit configuration and either ends the process or starts another RFD configuration operation. For example, if the control unit determines that the RFD needs to perform a DLA operation on the ISP-processed image data, the control unit may instruct the RFD (configured as ISP) to write its results to memory (internal memory or external memory), and the RFD configuration process may start again. On the other hand, if the control unit determines that the no more RFD operations are necessary, it may instruct the RFD to store or output its results to an external circuit.

It will be appreciated that while described as a temporal sequence of steps, the operations of the method 900 may in fact be performed out of sequence, including in advance of any requirement for processing of the subject data. For instance, the various design configurations for the modules involved in ISP. DLA, or other processing may be generated in advance, including any ancillary support such as debug which may be needed to produce an operable design, such that the finalized design "templates" may simply be accessed by the controller logic at runtime.

Additional Considerations

Throughout this specification, some embodiments have used the expressions "comprises," "comprising," "includes," "including," "has," "having" or any other variation thereof, all of which are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

As used herein any reference to any of "one embodiment" or "an embodiment", "one variant" or "a variant", and "one implementation" or "an implementation" means that a particular element, feature, structure, or characteristic described in connection with the embodiment, variant or implementation is included in at least one embodiment, variant or implementation. The appearances of such phrases in various places in the specification are not necessarily all referring to the same embodiment, variant or implementation.

Upon reading this disclosure, those of skill in the art will appreciate still additional alternative structural and functional designs as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

It will be recognized that while certain aspects of the technology are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

What is claimed:

1. A method comprising:
obtaining a first image data in a first format from a first image sensor connected directly to the computerized device;
programming a first reprogrammable processing device (RPD) to perform a first operation on at least a portion of the first image data;
processing the at least a portion of the first image data using the programmed first RPD to generate first output data, wherein the programming and the processing of the at least a portion of the first image data using the programmed first RPD are performed during a first time slot;
reprogramming the first RPD to perform a second operation on at least a portion of the first output data; and
processing the at least a portion of the first output data using the reprogrammed first RPD to generate second output data, wherein the reprogramming and the processing of the at least a portion of the first output data using the reprogrammed first RPD are performed during a second time slot subsequent to the first time slot, wherein the first and second time slots have a same temporal duration;
obtaining second image data from a second image sensor;
programming a second RPD to perform a third operation on at least a portion of the second image data;
processing the at least a portion of the second image data using the second RPD to generate third output data;
reprogramming the second RPD to perform a fourth operation on at least a portion of the third output data; and
processing the at least a portion of the third output data using the second RPD to generate fourth output data.

2. The method of claim 1, wherein at least one of a duration or starting point of each the first and second time slots is generated ad hoc.

3. The method of claim 1, wherein the first and second time slots are each generated prior to the programming.

4. The method of claim 1, wherein the first and second time slots have a different temporal duration, and each comprise at least one prescribed mini-slot, the at least one mini-slot referenced to a clock reference of the RPD.

5. The method of claim 1, wherein:
the obtaining image data in a first format from at least one image sensor comprises obtaining image data in a RAW format;
the programming a reprogrammable processing device (RPD) to perform a first operation on at least a portion of the obtained image data comprises programming the reprogrammable processing device (RPD) to convert the at least a portion of the obtained image from the RAW format to an image format; and
the reprogramming the RPD to perform a second operation on at least a portion of the first output data comprises programming the reprogrammable processing device (RPD) to apply a Bayer filter.

6. The method of claim 1, further comprising:
reprogramming the RPD to perform a third operation on at least a portion of the second output data; and
processing the at least a portion of the second output data using the reprogrammed RPD to generate third output data;
wherein the third output data comprises encoded image data encoded according to a lossy encoding format.

7. Computerized apparatus, comprising:
at least one image sensor;
a first reprogrammable processing device (RPD) in data communication with the at least a first image sensor;
at least one storage device in data communication with the first RPD;
at least one controller in data communication with the first RPD and configured to implement computerized logic causing the first RPD device to at least:
process first data output by the at least one image sensor using a first processing configuration to produce second data;
process the second data using a second processing configuration to produce third data; and
process the third data using a third processing configuration to produce fourth data,
wherein the first RPD, the at least one storage device, and the at least one controller are each contained within a common integrated circuit (IC) package, and the at least one image sensor is directly connected to the common IC package; and
a second RPD connected to a second image sensor, and the at least one storage device comprises a storage device in data communication with both of the first RPD and the second RPD.

8. The computerized apparatus of claim 7, wherein the at least one controller is further configured to implement computerized logic causing the first RPD device to at least:
access at least a portion of the at least one storage device to obtain the first data;
access at least a portion of the at least one storage device to obtain the second data; and
access at least a portion of the at least one storage device to obtain the third data;
wherein (i) each of the accesses to obtain the first data, second data, and third data; and (ii) each of the processing of the first data, second data, and third data, occur according to a schedule generated at least in part by the at least one controller.

9. The computerized apparatus of claim 7, wherein the first RPD comprises a plurality of circuit logic elements which may be logically combined in a plurality of different combinations, a first of the plurality of different combinations corresponding to the first processing configuration, a second of the plurality of different combinations corresponding to the second processing configuration, and a third of the plurality of different combinations corresponding to the third processing configuration.

10. The computerized apparatus of claim 9, wherein first RPD comprises a field programmable gate array (FPGA) apparatus comprising the plurality of circuit logic elements, at least portions of the circuit logic elements comprising logic rendered in hardware.

11. Integrated circuit apparatus comprising:
at least one first data interface;
at least one second data interface;
a controller interface; and
computerized logic configured to, under control of signals received via the controller interface:
receive first data via the at least one first interface;
process the first data using a first processing configuration to produce second data;
output the second data to a storage device via the at least one second data interface;
reconfigure the computerized logic to a second processing configuration;
access the second data from the storage device via the at least one second interface;
process the accessed second data using the second processing configuration to produce third data;
output the third data to the storage device via the at least one second data interface;
reconfigure the computerized logic to a third processing configuration;
access the third data from the storage device via the at least one second interface; and
process the accessed third data using the third processing configuration to produce fourth data,
wherein the computerized logic is configured such that:
at least the processing of the first data using a first processing configuration to produce the second data, and the output of the second data to the storage device via the at least one second data interface, occurs during a first time period;
at least the access of the second data from the storage device via the at least one second interface, and the processing of the accessed second data using the second processing configuration to produce the third data, and the output the third data to the storage device via the at least one second data interface, occurs during a second time period; and
at least the access of the third data from the storage device via the at least one second interface, and the processing of the accessed third data using the third processing configuration to produce the fourth data, occurs during a third time period, and
wherein the first, second, and third time periods comprise non-overlapping time periods, wherein the first, second, and third time periods each have different temporal durations than one another.

12. The Integrated circuit apparatus of claim 11, further comprising:
the storage device in data communication with the at least one second interface; and controller logic in communication with the controller interface; and wherein the storage device, the controller logic, the at least one first data interface, the at least one second data interface, the controller interface, and the computerized logic are all part of a unitary integrated circuit package.

13. The Integrated circuit apparatus of claim 12, wherein:

the storage device comprises a dynamic RAM (random access memory) device; and the computerized logic comprises a reconfigurable processing fabric having a plurality of logic cells or blocks.

14. The Integrated circuit apparatus of claim 11, further comprising a clock circuit; and wherein the first, second, and third time periods each comprise an integer multiple of a clock period or other clock-related parameter generated by the clock circuit.

15. The Integrated circuit apparatus of claim 11, wherein the storage device comprises a plurality of independently accessible storage areas, the at least one second data interface comprising a plurality of second data interfaces corresponding to respective ones of the plurality of independently accessible storage areas.

16. The computerized apparatus of claim 7, wherein the at least one image sensor comprises a first image sensor and a second image sensor, wherein the first and second image sensors are directly connected to the common IC package and oriented in:

a same direction as one another; or in different directions from one another.

17. The computerized apparatus of claim 7, wherein the at least one RPD is a first RPD, the first RPD is connected to the first image sensor, the computerized image capture and processing apparatus further comprises a second RPD connected to the second image sensor, and the at least one storage device comprises a storage device in data communication with both of the first RPD and the second RPD.

18. The method of claim 1, further comprising processing the second output data and the fourth output together to combine the second output data and the fourth output data into a common image.

* * * * *